(12) United States Patent
Saeki

(10) Patent No.: US 8,375,229 B2
(45) Date of Patent: Feb. 12, 2013

(54) APPARATUS FOR CONTROLLING SUPPLY OF ELECTRIC POWER AND APPARATUS FOR CONTROLLING ELECTRIC POWER

(75) Inventor: Toshiaki Saeki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 833 days.

(21) Appl. No.: 12/552,700

(22) Filed: Sep. 2, 2009

(65) Prior Publication Data

US 2010/0064151 A1  Mar. 11, 2010

(30) Foreign Application Priority Data

Sep. 9, 2008  (JP) ................. 2008-230521

(51) Int. Cl.
  *G06F 1/00* (2006.01)
  *G06F 1/26* (2006.01)
  *G06F 1/32* (2006.01)
(52) U.S. Cl. ....................... 713/300; 713/320
(58) Field of Classification Search .................. 713/300, 713/320
  See application file for complete search history.

(56) References Cited

U.S. PATENT DOCUMENTS

| | | | |
|---|---|---|---|
| 6,834,354 B1 * | 12/2004 | Togawa ................. | 713/320 |
| 7,114,084 B2 * | 9/2006 | Cioaca ................. | 713/300 |
| 7,272,732 B2 * | 9/2007 | Farkas et al. .......... | 713/320 |
| 7,385,373 B2 * | 6/2008 | Doruk et al. ........... | 320/107 |
| 7,424,629 B2 * | 9/2008 | Cioaca ................. | 713/300 |
| 7,437,576 B2 | 10/2008 | Makiyama et al. | |
| 7,617,406 B2 | 11/2009 | Yasuo | |
| 8,224,639 B2 | 7/2012 | Inoue | |

FOREIGN PATENT DOCUMENTS

| | | |
|---|---|---|
| JP | H08-152945 | 6/1996 |
| JP | 11-178247 A | 7/1999 |
| JP | 2005-285123 A | 10/2005 |
| JP | 2006-11793 A | 1/2006 |
| JP | 2007-213167 A | 8/2007 |

OTHER PUBLICATIONS

Xiaobo Fan, Wolf-Dietrich Weber, Luiz André Barroso "Power Provisioning for a Warehouse-sized Computer" In Proceedings of the ACM International Symposium on Computer Architecture, San Diego, CA, Jun. 2007.

Japanese Office Action mailed Oct. 16, 2012 for corresponding Japanese Application No. 2008-230521, with Partial English-language Translation.

\* cited by examiner

*Primary Examiner* — Paul R Myers
*Assistant Examiner* — Jeremy S Cerullo
(74) *Attorney, Agent, or Firm* — Fujitsu Patent Center

(57) ABSTRACT

A power supply control apparatus communicates with a power control apparatus which controls use of electric power of an electronic apparatus. A receiver unit receives a change request to change a power supply-distribution capacity supplied to one electronic apparatus from the power control apparatus controlling use of electric power of the one electronic apparatus. A calculation unit calculates a sum of the power supply-distribution capacity supplied to the one electronic apparatus in response to the received change request and power supply-distribution capacities supplied to the other electronic apparatuses except the one electronic apparatus. A comparison unit compares the maximum power supply-distribution capacity to the sum of the calculated power supply-distribution capacities. A determination unit determines whether or not a change in the power supply-distribution capacity supplied to the one electronic apparatus is allowable based on a result of the comparison.

12 Claims, 16 Drawing Sheets

FIG. 4

| REQUEST VALUE | STATE | | | |
|---|---|---|---|---|
| | S0 | S1 | S2 | S3 |
| POWER CONSUMPTION | 0W | 200W | 400W | 600W |
| AMOUNT OF HEAT GENERATION | 0W | 200W | 400W | 600W |
| VOLTAGE | 100V | 100V | 100V | 100V |
| FREQUENCY | 60Hz | 60Hz | 60Hz | 60Hz |
| UPS DURATION TIME | - | 0min | EQUAL TO OR LONGER THAN 10 min | EQUAL TO OR LONGER THAN 20 min |
| INSTANTANEOUS INTERRUPTION TIME | - | EQUAL TO OR SHORTER THAN 200 ms | EQUAL TO OR SHORTER THAN 200 ms | EQUAL TO OR SHORTER THAN 200 ms |
| POWER TRANSMISSION-DISTRIBUTION SYSTEM ID | L1 | | | |
| AREA ID | A2 | | | |
| PRIORITY LEVEL | 2 | | | |

| CLIENT UNIT ID | POWER TRANSMISSION-DISTRIBUTION SYSTEM ID | POWER SUPPLY-DISTRIBUTION CAPACITY | | | COOLING CAPACITY | AREA ID | PRIORITY LEVEL | EFFECTIVE TIME LIMIT |
|---|---|---|---|---|---|---|---|---|
| | | POWER CONSUMPTION | UPS DURATION TIME | INSTANTANEOUS INTERRUPTION TIME | AMOUNT OF HEAT GENERATION | | | |
| C1 | L1 | 600W | EQUAL TO OR LONGER THAN 20 min | EQUAL TO OR SHORTER THAN 200 ms | 600W | A5 | 1 | t1 |
| C2 | L1 | 400W | EQUAL TO OR LONGER THAN 10 min | EQUAL TO OR SHORTER THAN 200 ms | 400W | A2 | 2 | t2 |
| C3 | L2 | 200W | 0min | EQUAL TO OR SHORTER THAN 200 ms | 200W | A7 | 1 | t3 |
| C4 | L2 | 200W | EQUAL TO OR LONGER THAN 10 min | EQUAL TO OR SHORTER THAN 200 ms | 400W | A5 | 3 | t4 |
| ... | ... | ... | ... | ... | ... | ... | ... | ... |
| Cn | L3 | 60W | 0min | EQUAL TO OR SHORTER THAN 500 ms | 60W | A1 | 2 | tn |

ELECTRIC POWER SUPPLY CONTROL TABLE — 120

FIG. 10

| POWER TRANSMISSION-DISTRIBUTION SYSTEM ID | MAXIMUM SUPPLY OF ELECTRIC POWER | PRIORITY LEVEL | | |
|---|---|---|---|---|
| | | 1 | 2 | 3 |
| L1 | 6000kVA | 3000kVA | 2000kVA | 1000kVA |
| L2 | 12000kVA | 6000kVA | 4000kVA | 2000kVA |
| L3 | 3000kVA | 1500kVA | 1000kVA | 500kVA |

APPARATUS FOR CONTROLLING SUPPLY OF ELECTRIC POWER AND APPARATUS FOR CONTROLLING ELECTRIC POWER

CROSS-REFERENCE TO RELATED APPLICATIONS

This application is based upon and claims the benefit of priority of the prior Japanese Patent Application No. 2008-230521, filed on Sep. 9, 2008, the entire contents of which are incorporated herein by reference.

FIELD

The present application relates to a technique of controlling a total amount of electric power used in a facility, for example, a data center, a server room, or the like, capable of containing a plurality of electronic apparatuses.

BACKGROUND

In response to an increase in size, sophistication, and complication of data centers in recent years, a wide variety of electronic apparatuses (for example, servers, routers, storages or the like) are located therein. Furthermore, a majority of such electronic apparatuses located in the data center have a wide range of variation in power consumption. Due to the reasons discussed above, it has been very difficult to accurately estimate a power supply-distribution capacity necessary for the data center.

Moreover, if an excessive use of electric power (overload) that exceeds the power supply-distribution capacity in the data center occurs, this results in a voltage drop or an interruption of electric power, and as a result, a serious accident, such as the loss of data stored in the electronic apparatuses, may be caused. Thus, high reliability, for example, the supply of electric power to the data center without interruption, is necessary for the power supply and distribution.

However, as discussed above, it is very difficult to accurately estimate the power supply-distribution capacity necessary for the data center under current circumstances. In consequence, there is a problem that it is inevitable to make an investment in equipment to achieve a power supply-distribution capacity greater than what is actually necessary for the data center.

There is a conventional technique which makes supply of electric power within a range of an operating environment and/or of a power supply capacity possible by adequately controlling consumption of electric power over an entire circuit, so that the conventional technique achieves a reduction in power consumption of electronic devices (for example, a large scale integration, that is to say, an LSI).

However, the conventional technique disclosed above has a problem that it is very difficult to apply the conventional technique to such a facility, for example, a data center which contains electronic apparatuses owned by customers. This is because, in typical cases, the customers control the electronic apparatuses in the data center, and it is very difficult for the data center managers to control the operations of individual electronic apparatuses.

For the reason discussed above, to achieve highly reliable power supply/distribution, such as, the supply of electric power without interruption, it is still inevitable to make an unnecessarily large investment in the equipment in the data center. This may result in a problem of increasing costs for the data center.

According to one aspect of the present application, use of electric power that exceeds a maximum power supply-distribution capacity in a facility, such as a data center, a server room or the like, is effectively suppressed by accurately estimating a power supply-distribution capacity necessary for the facility, so that the problems in the conventional technique may be solved. According to an aspect of the present application, an unnecessarily large investment made in equipment for supplying and distributing the electric power in the facility may be reduced, if not prevented.

SUMMARY

A power supply control apparatus communicates with a power control apparatus which controls use of electric power of an electronic apparatus to which a power supply-distribution capacity is supplied in a facility. A storing unit stores the power supply-distribution capacity supplied to the plurality of electronic apparatuses located in the facility from among maximum power supply-distribution capacities capable of being supplied to the facility. A receiver unit receives a change request to change a power supply-distribution capacity supplied to one electronic apparatus among the plurality of electronic apparatuses from the power control apparatus controlling use of electric power of the one electronic apparatus. A calculation unit calculates a sum of the power supply-distribution capacity supplied to the one electronic apparatus in response to the received change request and the power supply-distribution capacities supplied to the other electronic apparatuses except the one electronic apparatus from contents stored in the storing unit. A comparison unit compares the maximum power supply-distribution capacity to the sum of the calculated power supply-distribution capacities. A determination unit determines whether or not a change in the power supply-distribution capacity supplied to the one electronic apparatus is allowable based on a result of the comparison. A sender unit sends a result of the determination to the power control apparatus.

BRIEF DESCRIPTION OF DRAWINGS

FIG. 4 is an explanatory diagram of contents stored in a state table;

FIG. 7 is an explanatory diagram of contents stored in an electric power supply control table;

FIG. 10 is an explanatory diagram of contents stored in an allocation table;

DESCRIPTION OF EMBODIMENTS

Hereinafter, a preferred embodiment of an apparatus for controlling the supply of electric power (hereinafter, referred to as a "power supply control apparatus"), an apparatus for controlling electric power (hereinafter, referred to as a "power control apparatus"), and a method of controlling the supply of electric power (hereinafter, referred to as a "power supply control method") will be disclosed with reference to drawings. Regarding the power supply control apparatus, the power control apparatus, and the power supply control method, a method is proposed to suppress an electric power supply that exceeds the maximum power supply of a facility by controlling the electric power supply of each electronic device on a permission basis, and centrally controlling the electric power supplied to electronic devices in a facility with the power supply control apparatus.

In the present embodiment, the power supply control apparatus indicates a master unit M that controls the supply of electric power in a facility such as a data center, a server room or the like; and the power control apparatus indicates a client unit C that controls use of electric power of the electronic apparatus in the facility.

(System Configuration of the Power Supply Control System)

Figure 1:
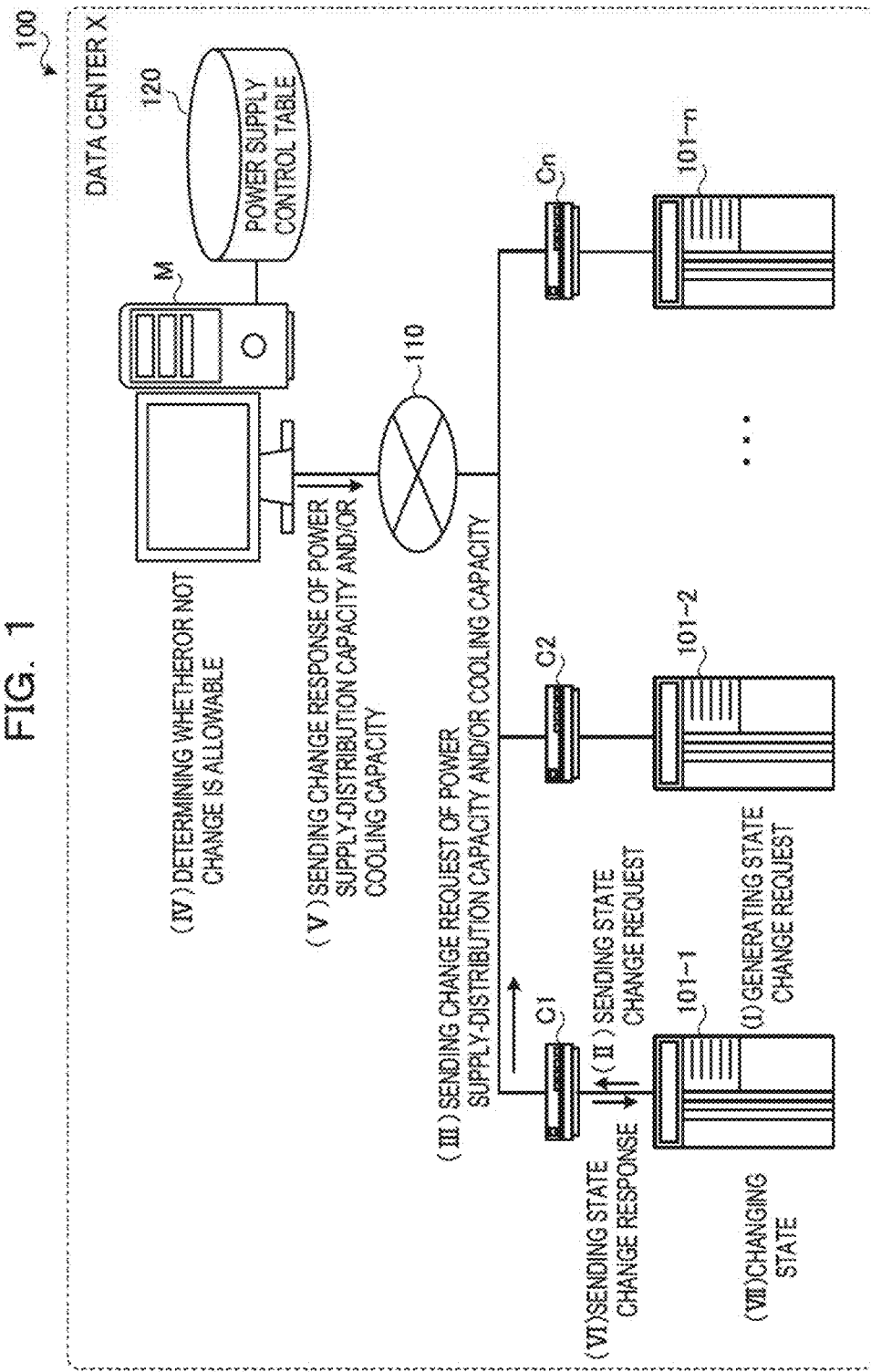
FIG. 1 is a system configuration diagram of a power supply control system.

First, a system configuration of a power supply control system according to the embodiment will be disclosed. FIG. 1 is a diagram of a system configuration of the power supply control system. A power supply control system 100 has a configuration that includes a master unit M and client units C1 through Cn in FIG. 1. The master unit M and the client units C1 through Cn are capable of communicating to one another through a network 110 such as a Local Area Network (LAN), a Wide Area Network (WAN), or a power line communication network.

The power supply control system 100 is established in a data center X. The data center X is a facility which holds servers 101-1 through 101-n owned by a customer and which provides services such as lines for connecting the Internet and maintenance/operation services.

The master unit M is a computer apparatus having a function of controlling a total amount of electric power used in the data center X and includes an electric power supply control table 120. The electric power supply control table 120 stores pieces of information associated with a capacity of supplying electric power and of distributing the electric power, (hereinafter, referred to as a "power supply-distribution capacity"), and a cooling capacity, both of which are at present used in the data center X. For example, an administrator of the data center X uses the master unit M.

The client units C1 through Cn are directly coupled to the servers 101-1 through 101-n owned by the customer. The client units C1 through Cn are computer apparatuses having a function of controlling the use of electric power of the servers 101-1 through 101-n. Note that, here, although one client unit (for example, a server-incorporated type) corresponds to one server, the embodiment is not be limited thereto. For example, it may also be possible that one client unit controls the use of electric power of a plurality of servers.

The servers 101-1 through 101-n are computers having a function of changing states that indicate status of the use of electric power by controlling parameters, for example, the number of clocks of a central processing unit (CPU), a voltage of the CPU, the number of cores used by the CPU, an amount of cache memory in the CPU, the number of rotations of a hard disk drive (HDD), and the number of rotations of a fan or the like.

A certain state is determined by controlling the parameters disclosed above and by changing combinations of a desired power supply-distribution capacity and a desired cooling capacity. Note that a detailed description on a function of changing the states in response to variations in loads applied to the servers 101-1 through 101-n will be disclosed below with reference to FIG. 2.

(Problems Associated with Conventional Technique)

Hereinafter, problems associated with a conventional technique in terms of the data center X as illustrated in FIG. 1 will be disclosed in detail. It is very difficult to accurately estimate the power supply-distribution capacity necessary for the data center X in the conventional technique. This results from a wide variety of electronic apparatuses (here, servers 101-1 through 101-n) in the data center X and from the wide fluctuation of the consumption of electric power depending on the loads in the electronic apparatuses.

The wide fluctuation in the consumption of electric power by the electronic apparatuses may be caused by, for example, a certain method that stops operations of parts of circuits by a reduction in the number of clocks and/or in the voltage of a processor, or by a reduction in the number of cache memories and/or cores, as well as a function of reducing the consumption of electric power in exchange for a processing capability of the electronic apparatus.

However, since a majority of the electronic apparatuses in the data center X are subject to control by the customer, it is very difficult for the data center X administration to control the electronic apparatuses. In the above case, the data center X administration has no other choice but to determine a capacity of the power supply-distribution equipment based on a total amount of maximum consumption of electric power based on each of the electronic apparatuses or the like. As a result, values actually measured do not serve as a useful reference.

Moreover, it is difficult to accurately know how much power supply-distribution capacity (specification value) is necessary for each of the electronic apparatuses under current techniques. This is because the number of electronic apparatuses in the data center X is huge, and it is very difficult to manually look up the specification sheets of each of the electronic apparatuses.

Due to the reasons disclosed above, an unnecessary power supply-distribution capacity is allocated in order to prevent an overload (use of electric power in excess of the power supply-distribution capacity) in the data center X according to the conventional technique. Thus, an unnecessary and excessive investment is made in the power supply-distribution equipment in the data center X.

In addition, there is another problem under the current circumstances, that is to say, the superfluous power supply-distribution capacity would leave little margin for problems associated with heat. Since the electronic apparatuses convert the electric power into heat, it is necessary to cool down the data center X to a temperature equal to or lower than a certain temperature so as to avoid a thermal runaway by the electronic apparatuses due to the excessive increase in the temperature of the data center X.

Typically, countermeasures, such as, providing a cooling apparatus, for example, an air conditioner and/or a fan, are taken so as to cool down the temperature of the data center X. However, in many cases, achieving the above countermeasures is very difficult due to lack of available space for placing such cooling apparatuses or due to the electric power supplied to such cooling apparatuses. It is possible to consider that the electronic apparatuses particularly located in a high temperature space may be moved to other spaces. However, in some cases, this solution may be difficult due to agreements entered into with the customers. (The spaces for locating the apparatuses are determined based on the agreements with respect to each of the customers.)

Therefore it is desirable that heat generation by each of the electronic apparatuses be controlled. The heat generated by the electronic apparatuses depends on the consumption of electric power by the electronic apparatuses, and the consumption of electric power by the electronic apparatuses depends on the loads of the electronic apparatuses. That is to say, it is necessary to control the loads of the electronic apparatuses to control the heat generated by the electronic apparatuses. However, as disclosed above, it is very difficult to control variations in the loads of each of the electronic apparatuses in the data center X.

According to the embodiment, in order to solve the problems disclosed above, electric power supplied to the servers 101-1 through 101-n in the data center X is centrally controlled by the master unit M. In addition, the supply of electric power that exceeds the maximum supply of electric power in the data center X is suppressed by controlling, on a permission basis, the electric power (power supply-distribution capacity and/or cooling capacity) supplied to each of the servers 101-1 through 101-n.

As opposed to the conventional technique where the supply of electric power is forcibly interrupted (for example, by breakers and fuses) upon occurrence of an overload, use of the present method may control the supply of electric power in the data center X without causing a significant adverse effect (for example, data loss) on each of the servers 101-1 through 101-n.

(Outline of Power Supply System)

Hereinafter, an outline of the power supply control system 100 will be disclosed. Here, for example, communication between the master unit M illustrated in FIG. 1 and the client unit C1 controlling the use of electric power of the server 101-1 will be disclosed.

(I) First, upon generation of a state change request, in the server 101-1, indicative of the use of electric power caused by an increase in processing capacity due to a power activation and/or an increase in load, (II) the server 101-1 sends the state change request to the client unit C1, from the server 101-1.

(III) In response to reception of the state change request sent from the server 101-1, the client unit C1 sends a change request for a power supply-distribution capacity and for a cooling capacity for the server 101-1 in response to the change in the state, to the master unit M. (IV) Then the master unit M determines whether or not the change in the power supply-distribution capacity and in the cooling capacity is allowable based on the change request from the client unit C1 and contents stored in the electric power supply control table 120.

(V) Thereafter the master unit M sends a change response (a result of the determination) indicating whether or not the change in the power supply-distribution capacity and in the cooling capacity is allowable to the client unit C1. (VI) Then the client unit C1 sends the change response indicating whether or not the change in the state is allowable to the server 101-1 based on the change response from the master unit M. (VII) Here, in response to reception of the change response, which is sent from the client unit C1 to the server 101-1 and indicating that the change in the state is allowable, the server 101-1 changes the state.

(Functions of Server)

Figure 2:
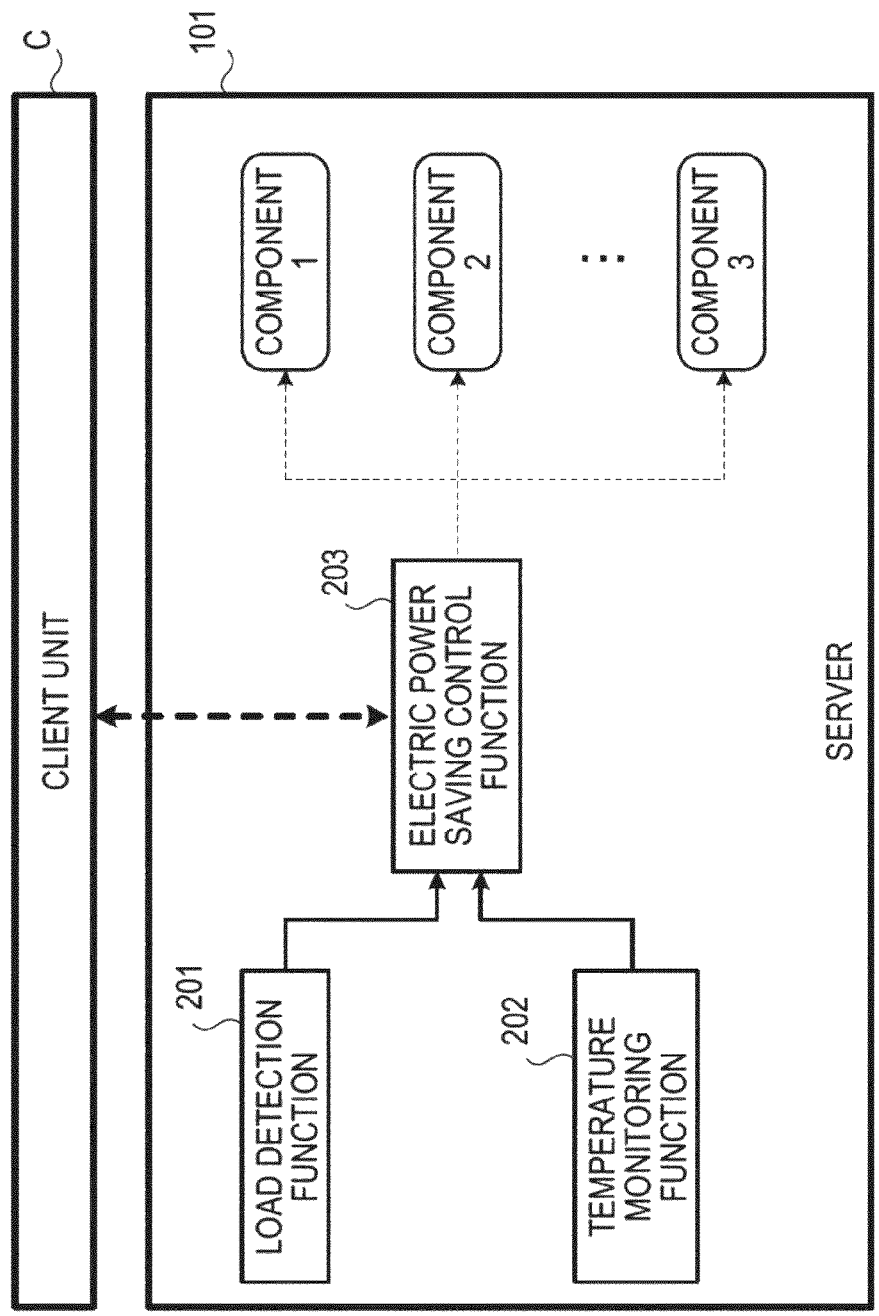
FIG. 2 is an explanatory diagram of functions of a server.

Hereinafter, functions of each of the servers 101-1 through 101-n (here, referred to as merely a "server 101") in order to implement the power supply control system 100 will be disclosed. FIG. 2 illustrates an explanatory diagram indicating the functions of the server 101. The server 101 includes a load detection function 201, a temperature monitoring function 202, and an electric power saving control function 203, in FIG. 2.

The load detection function 201 is a function of detecting a load applied to the server 101. For example, a scheduler of an operating system (OS) may perform the function. The temperature monitoring function 202 is a function of monitoring a temperature inside of the CPU For example, a temperature sensor incorporated in the CPU may perform the function.

The electric power saving control function 203 is a function of determining the state based on load information from the load detection function 201 and temperature information from the temperature monitoring function 202. For example, power consumption driver software may perform the function. For example, the electric power saving control function 203 determines the state in response to the load within limits where a certain temperature does not exceed a limit value.

In addition, the electric power saving control function 203 includes a function of sending the state change request for changing into the determined state, to the client unit C. Furthermore, the electric power saving control function 203 includes a function of giving an instruction of changing the state to respective components 1 to p (for example, CPU or the like) of the server 101, in case that the electric power saving control function 203 receives the change response indicating that the change in the state is allowed, from the client unit C. The server 101 is capable of switching the states by use of these functions 201 to 203.

(Hardware Configuration of Computer Apparatus)

Hereinafter, a hardware configuration of the computer apparatus illustrated in FIG. 1 (master unit M, client units C1 through Cn, and servers 101-1 through 101-n) will be disclosed. Note that all of the computer apparatuses illustrated in FIG. 1 do not necessarily include all of configuration units hereinafter disclosed.

Figure 3:
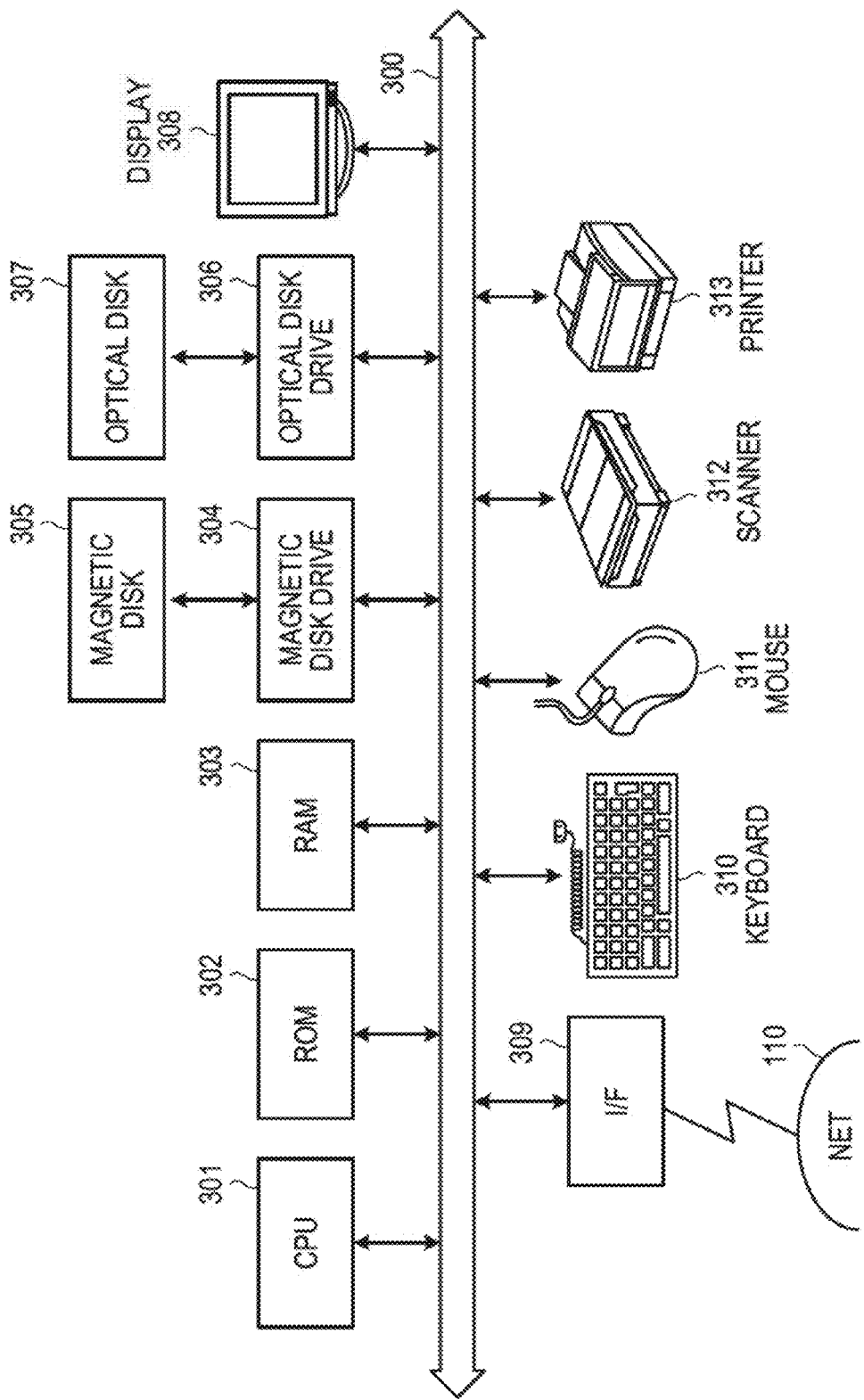
FIG. 3 is a block diagram of a hardware configuration of a computer apparatus.

FIG. 3 is a block diagram of a hardware configuration of the computer apparatus. The computer apparatus includes a CPU 301, a read only memory (ROM) 302, a random access memory (RAM) 303, a magnetic disk drive 304, a magnetic disk 305, an optical disk drive 306, and an optical disk 307, a display 308, an interface (I/F) 309, a keyboard 310, and a mouse 311, in FIG. 3. In addition, each of the configuration units is coupled to one another through a bus 300.

Here, the CPU 301 controls the entire computer apparatus. The ROM 302 stores programs, for example, a boot program. The RAM 303 is used as a work area of the CPU 301. The magnetic disk drive 304 controls reading and writing of data from and to the magnetic disk 305 based on the control by the CPU 301. The magnetic disk 305 stores the data written based on the control by the magnetic disk drive 304.

The optical disk drive 306 controls reading and writing of data from and to the optical disk 307 based on the control by the CPU 301. The optical disk 307 stores the data written based on the control by the optical disk drive 306 and causes the computer to read the data stored on the optical disk 307.

The display 308 displays a cursor, icons, toolboxes, and a variety of data such as documents, images, information on functions, and the like. For example, a CRT, a TFT liquid crystal display, a plasma display or the like may be used as the display 308.

The I/F 309 is coupled to a network 110, for example, the LAN, the WAN, the Internet, the power line communication network or the like through a communication line. The I/F 309 is further coupled to the other apparatuses through the network 110. Furthermore, the I/F 309 interfaces between the network 110 and the inside of the computer apparatus, and the I/F 309 controls the input and output of data from and to an external apparatus. For example, a modem, a LAN adapter, or the like may be used as the I/F 309.

(Contents Stored in State Table)

Hereinafter, a state table used in the client unit C2 that controls the use of electric power of the server 101-2 will be disclosed with reference to the server 101-2 in FIG. 1 as one example. FIG. 4 is an explanatory diagram of contents stored in the state table. A state table 400 stores request values with respect to each of the states S0 to S3, each of which is changed in response to the loads applied to the server 101-2.

Here, the state table 400 stores consumption of electric power, an amount of heat generation, a voltage, a frequency, an uninterruptible power supply (UPS) duration time, and an instantaneous interruption time as the request values. The consumption of electric power [W] is electric power consumed in the server 101-2. The amount of heat generation [W] is heat generated by the server 101-2. The voltage [V] and the frequency [Hz] are a voltage and a frequency each used in the server 101-2.

The UPS duration time [min] is the certain length of time necessary to supply electric power upon occurrence of any problem in a power supply (power failure, variation in voltages or the like). An instantaneous interruption time [ms] is a certain length of time necessary for switching to a standby power system upon occurrence of the power failure. Here, the state S0 indicates a "power OFF" state (note, however, that a slight standby power may be consumed), the state S1 indicates a low-load state, the state S2 indicates a normal-load state, and the state S3 indicates a high-load state.

In addition, the state table 400 stores a power transmission-distribution system ID "L1" for a power transmission-distribution system to which the server 101-2 is coupled, an area ID "A2" for an area where the server 101-2 is located, and a priority level "2" set for the server 101-2. Note that the power transmission-distribution system ID, the area ID, and the priority level will be disclosed below.

The client unit C2 may recognize the consumption of electric power, the amount of heat generation, the voltage, the frequency, the UPS duration time, and the instantaneous interruption time all of which are desired for switching the states of the server 101-2 by referring to the state table 400. Note that the state table 400 may be stored in, for example, the RAM 303 in the client unit C2, the magnetic disk 305, the optical disk 307 or the like.

(Maximum Power Supply-distribution Capacity Table)

Figure 5:
FIG. 5 is an explanatory diagram of contents stored in a maximum power supply-distribution capacity table.

Next, contents stored in a maximum power supply-distribution capacity table that specifies a maximum power supply-distribution capacity (specification values) capable of being supplied in the data center X will be disclosed. The maximum power supply-distribution capacity table is used in the master unit M illustrated in FIG. 1. FIG. 5 is an explanatory diagram of the contents stored in the maximum power supply-distribution capacity table.

The maximum power supply-distribution capacity table 500 stores specification values associated with maximum power supply-distribution capacities capable of being supplied in respective power transmission-distribution systems L1 through L3, with respect to each of the power transmission-distribution systems L1 through L3 provided in the data center X. Here, the maximum power supply-distribution capacity table 500 stores the maximum supply of electric power, the voltage, the frequency, a USP capacitance, and the instantaneous interruption time as the specification values.

The maximum supply of electric power [kVA] is a maximum value of electric capacitance capable of being supplied to the servers 101-1 through 101-n. Note that the servers 101-1 through 101-n are the targets to which the power supply-distribution capacity is supplied. The voltage [V] and the frequency [Hz] are voltages and frequencies used in each of the power transmission-distribution systems L1 through L3. The UPS capacitance [kWh] is electric capacitance tentatively capable of being supplied to the servers 101-1 through 101-n upon occurrence of any problem in the power supply (for example, power failure, variation in voltages, or the like). The instantaneous interruption time [ms] is the time taken for switching to the standby power system upon occurrence of a power failure.

Here, when it comes to the power transmission-distribution system L1, as an example, the maximum supply of electric power is 6000 [kVA], the voltage is 100[V], the frequency is 60 [Hz], the UPS capacitance is 1200 [kWh], and the instantaneous interruption time is equal to or shorter than 200 [ms]. Note that the maximum power supply-distribution capacity table 500 is stored in, for example, the RAM 303 of the master unit M, the magnetic disk 305, the optical disk 307, or the like.

(Maximum Cooling Capacity Table)

Figure 6:
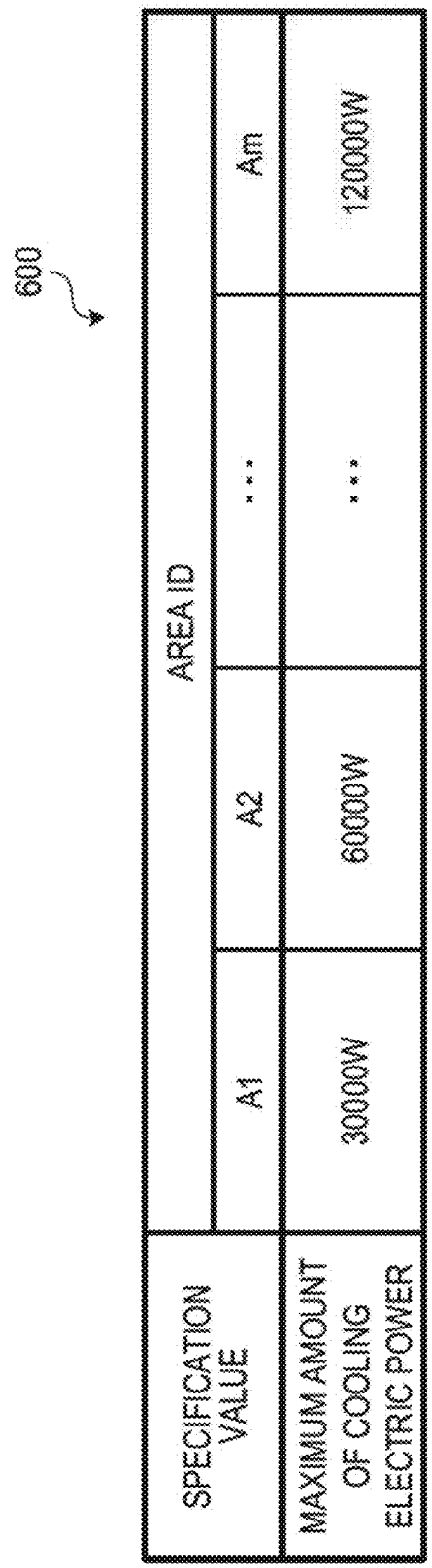
FIG. 6 is an explanatory diagram of contents stored in a maximum cooling capacity table.

Next, contents stored in a maximum cooling capacity table which specifies specification values for a maximum cooling capacity capable of cooling in the data center X will be disclosed. The maximum cooling capacity table is used in the master unit M illustrated in FIG. 1. FIG. 6 is an explanatory diagram of the contents stored in the maximum cooling capacity table.

A maximum cooling capacity table 600 stores specification values of maximum cooling capacities capable of cooling in respective areas A1 through Am, with respect to each of the areas A1 through Am in the data center X. Here, the maximum cooling capacity table 600 stores a maximum amount of cooling electric power as the specification values. The maximum amount of cooling electric power [W] is a maximum value of the amount of heat generation (electric power), and if the thermal runaway of the servers in respective areas A1 through Am lies, the thermal runaway may be suppressed.

Here, for the area A1, as an example, the maximum amount of cooling electric power is 30000 [W]. This means that a temperature of the area A1 may be maintained at a level equal to or lower than an appropriate temperature until the sum of the amounts of heat generation of a server group located in the area A1 reaches 30000 [W]. Note that the maximum cooling capacity table 600 is stored in, for example, the RAM 303 of the master unit M, the magnetic disk 305, the optical disk 307, or the like.

(Contents Stored in Electric Power Supply Control Table)

Hereinafter, contents stored in the electric power supply control table that stores the power supply-distribution capacities supplied to each of the servers 101-1 through 101-n and the cooling capacities allocated to each of the servers 101-1 through 101-n will be disclosed. The electric power supply control table is used in the master unit M illustrated in FIG. 1.

FIG. 7 is an explanatory diagram of contents stored in the electric power supply control table. The electric power supply control table 120 in FIG. 7 stores present value data 700-1 through 700-n, with respect to each of the client units C1 to Cn that controls the use of electric power in each of the servers 101-1 through 101-n.

The current value data 700-1 through 700-n includes the power supply-distribution capacities currently supplied to each of the servers 101-1 through 101-n and the cooling capacities currently allocated to each of the servers 101-1 through 101-n. Here, the power supply-distribution capacity indicates the consumption of electric power, the UPS duration time, and the instantaneous interruption time that may be used by each of the servers 101-1 through 101-n. The cooling capacity indicates the amounts of heat generation capable of being consumed by each of the servers 101-1 through 101-n.

In addition, the current value data 700-1 through 700-n include the power transmission-distribution systems L1 through L3 to which each of the servers 101-1 through 101-n are coupled, the areas A1 through Am on which each of the servers 101-1 through 101-n are located, the priority levels, and an effective time limit for each of the servers 101-1 through 101-n. Note that the priority level and the effective time limit will be disclosed below.

For example, for the server 101-2 coupled to the power transmission-distribution system L1 in the area A2, the following values may be recognized based on the current value data 700-2:

(Consumption of electric power: 400 [W], UPS duration time: equal to or longer than 10 [min], instantaneous interruption time: equal to or shorter than 200 [ms], amount of heat generation: 400 [W], priority level: 2, and effective time limit: t2)

Note that the electric power supply control table 120 is stored in, for example, the RAM 303 of the master unit M, the magnetic disk 305, the optical disk 307, or the like.

(Functional Configuration of the Master Unit)

Figure 8:
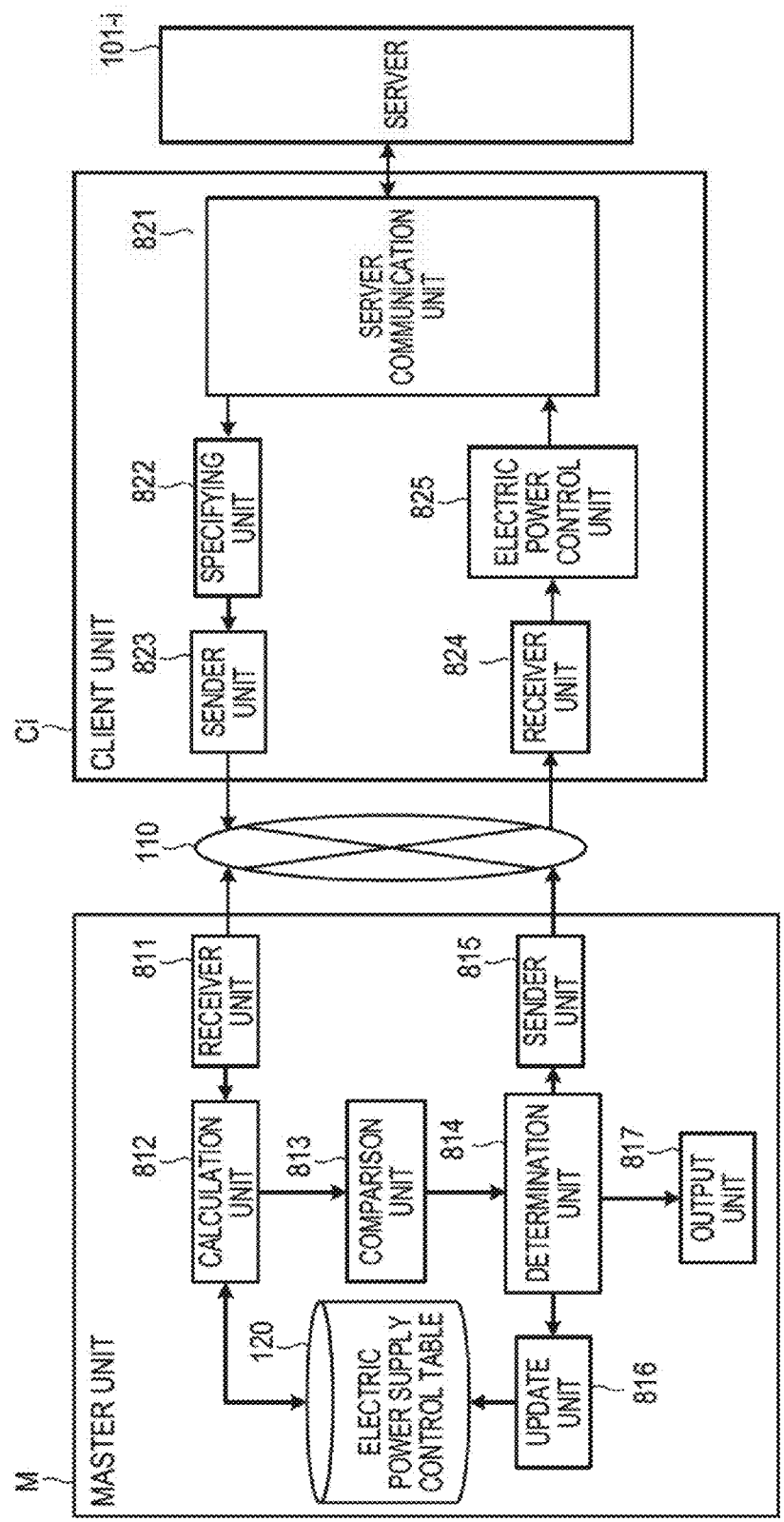
FIG. 8 is a block diagram of a functional configuration of the power supply control system.

Hereinafter a functional configuration of the power supply control system 100 will be disclosed. FIG. 8 is a block diagram of a functional configuration of the power supply control system. First, a functional configuration of the master unit M will be disclosed. In FIG. 8, the master unit M has a configuration that includes a receiver unit 811, a calculation unit 812, a comparison unit 813, a determination unit 814, a sender unit 815, an update unit 816, and an output unit 817. The function serving as a control unit (receiver unit 811 through output unit 817) is achieved by causing the CPU 301 to execute a program stored in, for example, the ROM 302, the RAM 303, the magnetic disk 305, the optical disk 307 and so on or achieved by the I/F 309, illustrated in FIG. 3.

The receiver unit 811 has a function of receiving the change request for the power supply-distribution capacity supplied to a sever 101-i (Note that i=1, 2, through n.) among the plurality of servers 101-1 through 101-n, from a client unit Ci that controls use of electric power of the server 101-i. The change request is request data that requests changes in an electric capacitance (supply of electric power) and the UPS duration time necessary for the server 101-i.

Moreover, the change request may include an instantaneous interruption time in the server 101-i, which is taken for switching to the standby power system, upon occurrence of the power failure and/or a voltage value, a current value or the like used by the server 101-i. The change request is sent from the client unit Ci to the master unit M in response to the state change request from the server 101-i to the client unit Ci, for example, based on the variation in a load applied to the server 101-i.

Furthermore, it may also be possible that the receiver unit 811 receives the change request of the cooling capacity (amount of heat generation) allocated to the server 101-i from the client unit Ci that controls the use of electric power of the server 101-i. Note that the change request thus received is stored in, for example, the RAM 303, the magnetic disk 305, the optical disk 307, or the like.

Figure 9:
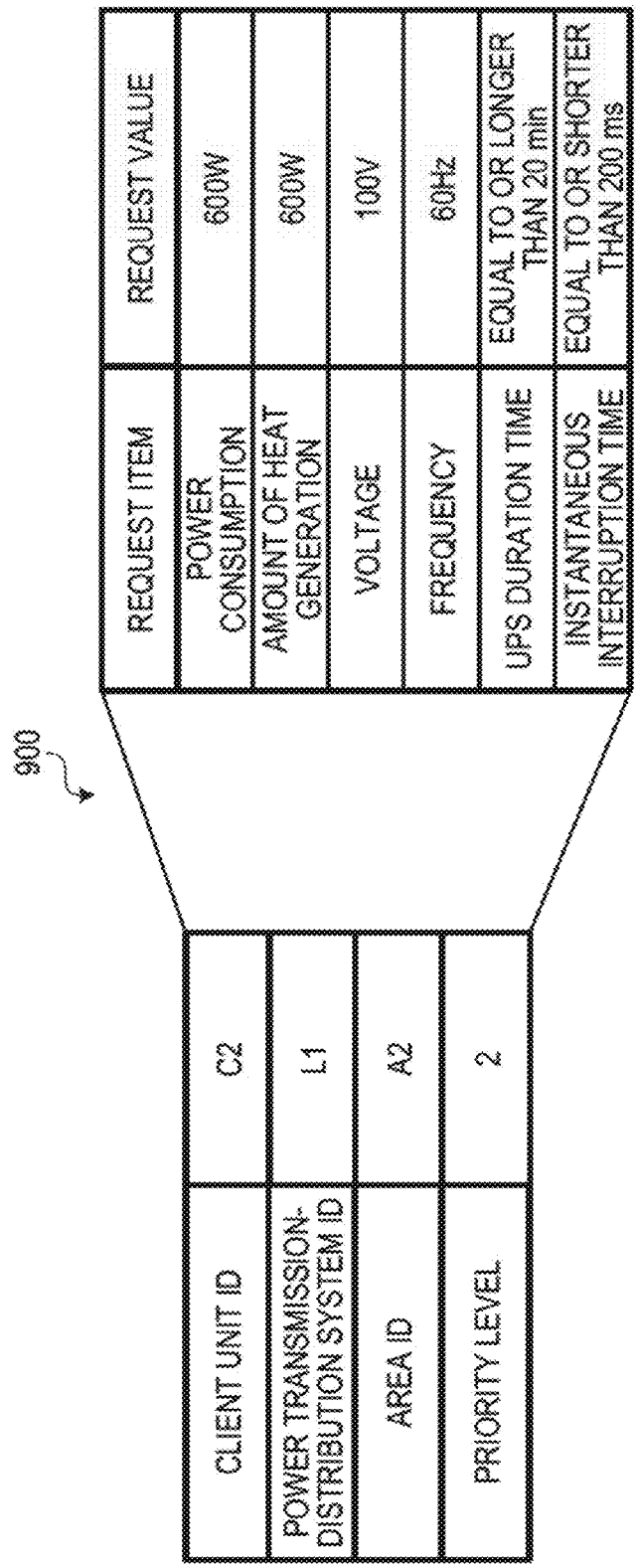
FIG. 9 is an explanatory diagram of a detailed example of a change request.

A detailed example of the change request will be disclosed hereinafter. FIG. 9 is an explanatory diagram of a detailed example of the change request. A change request 900 is request associated with changes in the power supply-distribution capacity (consumption of electric power, voltage, frequency, UPS duration time, instantaneous interruption time) and the cooling capacity (amount of heat generation), in FIG. 9.

Based on the change request 900, the master unit M may recognize that the request is a request sent from the client unit C2 controlling the use of electric power of the server 101-2 having the priority level 2 that is located in the area A2 in the data center X and coupled to the power transmission-distribution system L1 based on a client unit ID, a power transmission-distribution system ID, an area ID, and the priority level (see sections on the left side in FIG. 9).

In addition, based on the change request 900, the master unit M may recognize the request values of the power supply-distribution capacity (consumption of electric power: 600 [W], voltage: 100 [V], frequency 60 [Hz], UPS duration time: equal to or longer than 10 [min], and the instantaneous interruption time: equal to or shorter than 200 [ms]) and the request value of cooling capacity (amount of heat generation: 600 [W]) based on the request values of respective request items (see sections on the right side in FIG. 9). Note that the change request 900 may include a floor number, the number assigned to a certain rack, the order assigned to the certain rack, or the like in the data center X where the server 101-2 is located.

Hereinafter, an explanation with reference to FIG. 8 will be continued. The calculation unit 812 has a function of calculating a sum of the power supply-distribution capacity supplied to the server 101-i in response to the change request received by the receiver unit 811 and the power supply-distribution capacities supplied to all the servers 101-1 through 101-n except for the server 101-i. The power supply-distribution capacities supplied to each of the servers 101-1 through 101-n are stored, for example, in the electric power supply control table 120 illustrated in FIG. 7.

For example, the calculation unit 812 calculates the sum associated with the consumption of electric power (supply of electric power) in the power supply-distribution capacity included in the change request. Hereinafter, an example of details of a calculation process will be disclosed.

First, the calculation unit 812 calculates a first sum by reading the consumption of electric power (supply of electric power) in all the servers 101-1 through 101-n except for the server 101-i from the electric power supply control table 120 based on the client unit ID and by summing the consumption of electric power. Then the calculation unit 812 calculates a second sum by summing the first sum and consumption of electric power of the server 101-i specified based on the change request.

The second sum (hereinafter, referred to as a "sum $P_{sum}$") is a total amount of supply of electric power for the entire data center X in responding to the change request from the client unit Ci. Moreover the sum $P_{sum}$ is a result of the calculation by the calculation unit 812. Note that the result of the calculation is stored in, for example, the RAM 303, the magnetic disk 305, the optical disk 307, or the like.

Furthermore, the calculation unit 812 executes a calculation process based on the power-transmission-distribution-system, if the data center X is equipped with a plurality of power transmission-distribution systems (here, indicating the power transmission-distribution systems L1 through L3). Hereinafter, the calculation process, in which the sum $P_{sum}$ of the consumption of electric power is calculated based on each of the power transmission-distribution system, will be disclosed. First, the calculation unit 812 specifies a power transmission-distribution system Lj (j=1, 2, and 3) to which the server 101-$i$ is coupled based on the power transmission-distribution system ID included in the change request.

Then the calculation unit 812 reads the consumption of electric power (supply of electric power) in all the servers 101-1 through 101-$n$ except for the server 101-$i$ among the servers 101-1 through 101-$n$ coupled to the power transmission-distribution system Lj from the electric power supply control table 120 based on the power transmission-distribution system ID. Thereafter the calculation unit 812 calculates the first sum by summing the consumption of electric power.

Then the calculation unit 812 calculates the second sum (sum $P_{sum}$) by summing the first sum and the consumption of electric power of the server 101-$i$ specified based on the change request. The sum $P_{sum}$ is a total amount of the supply of electric power of the power transmission-distribution system Lj desired in responding to the change request from the client unit Ci.

Furthermore, it may also be possible that the calculation unit 812 calculates the sum of the cooling capacity allocated to the server 101-$i$ in response to the change request and the cooling capacities allocated to all the servers 101-1 through 101-$n$ except for the server 101-$i$. Hereinafter, one example of details of a calculation process will be disclosed.

First, the calculation unit 812 calculates the first sum by reading amounts of heat generation (cooling capacity) in all the servers 101-1 to 101-$n$ except for the server 101-$i$, from the electric power supply control table 120 based on the client unit ID, and by summing these amounts of heat generation. Next the calculation unit 812 calculates a second sum by summing the first sum and an amount of heat generation of the server 101-$i$ specified based on the change request.

The second sum (hereinafter, referred to as a "sum $H_{sum}$") is a total amount of the cooling capacity desired in responding to the change request from the client unit Ci. In addition, the sum $H_{sum}$ is a result of the calculation by the calculation unit 812. Note that the result of the calculation is stored in, for example, the RAM 303, the magnetic disk 305, the optical disk 307, or the like.

Moreover, the calculation unit 812 executes the calculation process based on each of the areas, in case that the data center X is divided into the plurality of areas (here, areas A1 through Am). Hereinafter, the calculation process of calculating the sum of the cooling capacity executed based on each area will be disclosed. First the calculation unit 812 specifies an area Ak (k=1, 2 through m) in which the server 101-$i$ is located based on the area ID included in the change request.

Thereafter the calculation unit 812 reads the amounts of heat generation (cooling capacity) in all the servers 101-1 through 101-$n$ except for the server 101-$i$ among the servers 101-1 through 101-$n$ located in the area Ak, from the electric power supply control table 120, based on the area ID. Then the calculation unit 812 calculates the first sum by summing these amounts of heat generation.

Then the calculation unit 812 calculates the second sum (sum $H_{sum}$) by summing the first sum and the amount of heat generation of the server 101-$i$ specified based on the change request. The sum $H_{sum}$ is a total amount of a cooling capacity in the area Ak desired for responding to the change request from the client unit Ci.

The comparison unit 813 has a function of comparing the maximum power supply-distribution capacity capable of being supplied in the data center X to the sum of the power supply-distribution capacity calculated by the calculation unit 812. For example, the comparison unit 813 compares the maximum supply of electric power (hereinafter, referred to as a "maximum supply of electric power $P_{max}$") capable of being supplied to each of the servers 101-1 through 101-$n$ to the sum $P_{sum}$ of the calculated consumption of electric power.

In addition, it may also be possible that the comparison unit 813 compares a maximum cooling capacity (hereinafter, referred to as a "maximum cooling capacity $H_{max}$") capable of being allocated to each of the servers 101-1 through 101-$n$ to the sum $H_{sum}$ of the cooling capacity calculated by the calculation unit 812. Note that a result of the comparison is stored in, for example, the RAM 303, the magnetic disk 305, the optical disk 307, or the like.

Furthermore, it may also be possible that the comparison unit 813 compares a voltage (hereinafter, referred to as a "specification voltage"), a frequency, a UPS duration time, and an instantaneous interruption time (hereinafter, referred to as a "specification instantaneous interruption time") of the supply of electric power capable of being supplied in the data center X with a voltage (hereinafter, referred to as a "request voltage"), a frequency, a UPS duration time (hereinafter, referred to as a "request UPS duration time"), and an instantaneous interruption time (hereinafter, referred to as a "request instantaneous interruption time") that are specified based on the change request, respectively.

Note that the UPS duration time of the supply of electric power capable of being supplied in the data center X may be obtained by using a UPS capacitance (hereinafter referred to as a "UPS capacitance $UC_{max}$") defined as specification values of the data center X (power transmission-distribution systems L1 through L3) and the total amount (sum $P_{sum}$ of the consumption of electric power) of the supply of electric power, in the entire data center X, desired for responding to the change request from the client unit Ci.

For example, first the comparison unit 813 reads the UPS capacitance $UC_{max}$ of the power transmission-distribution Lj from the maximum power supply-distribution capacity table 500 illustrated in FIG. 5 based on the power transmission-distribution system ID. Next the comparison unit 813 may obtain the maximum UPS duration time by substituting the UPS capacitance $UC_{max}$ and the sum $P_{sum}$ of the consumption of electric power of the power transmission-distribution system Lj into Equation (1) below. Note that the maximum UPS duration time is represented as $UT_{max}$ and a power factor is assumed as a value "1".

$$UT_{max} = UC_{max}/P_{sum} \qquad (1)$$

The determination unit 814 has a function of determining whether or not the change in power supply-distribution capacity supplied to the server 101-$i$ is allowable based on a result of the comparison by the comparison unit 813.

Hereinafter one example of details of a determination process will be disclosed. Here, determination processes i) to v) hereinafter disclosed are executed by using the following Equations (2) to (6), and it is determined whether or not the change in power supply-distribution capacity is allowable based on results of judgments in the processes.

i) Consumption of Electric Power (Supply of Electric Power)

$$P_{sum} \leq P_{max} \qquad (2)$$

Equation (2) is to allow a judgment on whether or not the total amount of the supply of electric power desired for responding to the change request from the client unit Ci falls within a range of the maximum supply of electric power $P_{max}$. Here, the determination unit 814 determines that the change in the power supply-distribution capacity is allowable if the sum $P_{sum}$ of the consumption of electric power is equal to or lower than the maximum supply of electric power $P_{max}$.

ii) Cooling Capacity (Amount of Heat Generation)

$$H_{sum} \leq H_{max} \quad (3)$$

Equation (3) is to allow a judgment on whether or not the total amount of the cooling capacity desired for responding to the change request from the client unit Ci falls within a range of the maximum cooling capacity $H_{max}$. Here, the determination unit 814 determines that the change in the cooling capacity is allowable if the sum $H_{sum}$ of the cooling capacity is equal to or less than the maximum cooling capacity $H_{max}$.

iii) Voltage (Note that $V_{spe}$ Represents the Specification Voltage and $V_{req}$ Represents the Request Voltage.)

$$V_{req} = V_{spe} \quad (4)$$

Equation (4) is to allow a judgment on whether or not the specification voltage $V_{spe}$ of the supply of electric power capable of being supplied in the data center X (power transmission-distribution systems L1 through L3) matches the request voltage $V_{req}$ based on the change request. Here, the determination unit 814 determines that the change in the power supply-distribution capacity is allowable if the specification voltage $V_{spe}$ matches the request voltage $V_{req}$.

iv) UPS Duration Time (Note that $UT_{reg}$ Represents the Request UPS Duration Time.)

$$UT_{reg} \leq UT_{max} \quad (5)$$

Equation (5) is to allow a judgment on whether or not the request UPS duration time $UT_{req}$ desired for responding to the change request from the client unit Ci falls within a range of the maximum UPS duration time $UT_{max}$. Here, the determination unit 814 determines that the change in the power supply-distribution capacity is allowable if the request UPS duration time $UT_{req}$ is equal to or shorter than the maximum UPS duration time $UT_{max}$.

v) Instantaneous Interruption Time (Note that $ST_{spe}$ Represents the Specification Instantaneous Interruption Time and $ST_{req}$ Represents the Request Instantaneous Interruption Time.)

$$ST_{reg} \geq ST_{spe} \quad (6)$$

Equation (6) is to allow a judgment on whether or not the specification instantaneous interruption time $ST_{spe}$ in the data center X (power transmission-distribution systems L1 through L3) satisfies the request instantaneous interruption time $ST_{req}$ based on the change request. Here, the determination unit 814 determines that the change in the power supply-distribution capacity is allowable if the requested instantaneous interruption time $ST_{req}$ is equal to or longer than the specification instantaneous interruption time $ST_{spe}$.

Note that the judgment processes i) to v) disclosed above are executed based on each power transmission-distribution system or based on each area if the data center X is equipped with a plurality of power transmission-distribution systems or if the data center X is divided into a plurality of areas.

Moreover it may also be possible that the judgment processes of iii) and iv) are made in consideration of tolerable voltages and fluctuations in the instantaneous interruption time which may be handled by each of the servers 101-1 through 101-n. For example, electronic apparatuses may tolerate fluctuations in voltage values depending on capacities of power supply units (PSU) incorporated in the electronic apparatuses. In addition, a majority of electronic apparatuses does not have failures if an instantaneous interruption time is approximately 0.1 [s] in switching their electric power systems to the standby power systems.

It may also be possible that the judgment processes iii) and v) are executed in consideration of the tolerable fluctuations if pieces of information associated with the fluctuations tolerable in such electronic apparatuses are included in the change request sent from the client unit Ci.

For example, the judgment process iii) disclosed above is configured to make the judgment based on $[(0.9 \times V_{req}) \leq V_{spe} \leq (1.1 \times V_{req})]$ if the server 101-i is capable of tolerating plus/minus 10% of voltage fluctuations. Then it is judged that the change in the power supply-distribution capacity is tolerable if the voltage $V_{spe}$ falls within a range of plus/minus 10% of the voltage $V_{req}$.

Furthermore it may also be possible that whether the change in the power supply-distribution capacity and/or the change in the cooling capacity is/are allowable or not is finally determined if results of the judgment processes i) through v) disclosed above are all allowable. Note that the results of the determination are stored in, for example, the RAM 303, the magnetic disk 305, the optical disk 307, or the like.

Moreover, it may also be possible that the determination unit 814 determines that the change in the power supply-distribution capacity and/or the change in the cooling capacity are allowable without executing the judgment processes i) through v) disclosed above if the power supply-distribution capacity and the cooling capacity after the change fall below the power supply-distribution capacity and the cooling capacity before the change. This is because it is difficult to suppose that the change disclosed above causes the maximum power supply-distribution capacity and/or the maximum cooling capacity in the data center X to be exceeded. The loads for the determination processes may be reduced with the determination processes disclosed above.

The sender unit 815 has a function of sending a result of the determination by the determination unit 814 to the server 101-i. The result of this determination is the change response reporting whether the change in the power supply-distribution capacity supplied to the server 101-i or in the cooling capacity allocated to the server 101-i is allowable or not. The client unit Ci controls the change in the state of the server 101-i in response to the change response.

Moreover it may also be possible that the change response, which reports that the change is allowable, includes an effective time limit by which the power supply-distribution capacity and/or the cooling capacity in response to the change request in the server 101-i may be used. This effective time limit is to allow withdrawal of the power supply-distribution capacity and the cooling capacity once allowed for the server 101-i. With the effective time limit, for example, continuous use of the power supply-distribution capacity and the cooling capacity to the servers whose agreements with the customers has been expired and which are faulty may be reduced if not prevented. Note that the master unit M measures a current time necessary for setting the effective time limit.

The client unit Ci sends an extension request for extending use of the power supply-distribution capacity and use of the cooling capacity used in the server 101-i to the master unit M based on the effective time limit. In the above case, the receiver unit 811 receives the extension request associated with the power supply-distribution capacity and the cooling capacity of the server 101-i from the client unit Ci. Thereafter the calculation unit 812 calculates a new effective time limit by summing the current time and a given time (for example, 1 hour).

Then the sender unit 815 sends an extension response reporting that the extension of the power supply-distribution capacity and the cooling capacity is allowable to the client unit Ci. Note that the given time for calculating the effective time limit may be set arbitrarily in advance by a user who manipulates the key board 310, the mouse 311, or the like illustrated in FIG. 3.

The output unit 817 has a function of outputting a result of the determination by the determination unit 814. For example, it may also be possible that the output unit 817 outputs a message indicating a discrepancy between the specification voltage $V_{spe}$ and the request voltage $V_{req}$, a message indicating that the request UPS duration time $UT_{req}$ lies outside a range of the maximum UPS duration time $UT_{max}$, and a message indicating that the specification instantaneous interruption time $ST_{spe}$ does not satisfy the requested instantaneous interruption time $ST_{req}$.

With the messages disclosed above, the administrator of the data center X may figure out failures, for example, the server 101-$i$ is coupled to a wrong power transmission-distribution system Lj, by checking results of the output.

Note that such an output may include, for example, displaying on the display 308, outputting by the printer 313, or sending to an external apparatus by the I/F 309. Furthermore, it may also be possible that the output is stored in, for example, the RAM 303, the magnetic disk 305, the optical disk 307 or the like.

(Priority Level of Server)

Hereinafter priority levels that are set for each of the servers 101-1 through 101-$n$ will be disclosed. The priority level is a system that achieves preferential allocation of the power supply-distribution capacity and the cooling capacity to the servers 101-1 through 101-$n$ having high priority levels. The priority level is set based on the agreements between the data center X and a customer, who utilizes each of the servers 101-1 through 101-$n$. Here "1" is set for the server having a highest priority level, "2" is set for the server having a second highest priority level, "3" is set for the server having a third highest priority level, and so on.

A variety of processes are carried out by the calculation unit 812, the comparison unit 813, and the determination unit 814, based on the priority levels when the priority levels are set for each of the servers 101-1 through 101-$n$. Hereinafter, details of executing the variety of processes based on the priority levels will be disclosed by focusing on the supply of electric power (power supply-distribution capacity) capable of being supplied to each of the servers 101-1 through 101-$n$.

First an allocation table that stores the power supply-distribution capacity with respect to each priority level will be disclosed. FIG. 10 is an explanatory diagram of contents stored in the allocation table. In FIG. 10, an allocation table 1000 stores allocation results 1000-1 to 1000-3. Each of the priority levels 1 through 3 is not only allocated with respect to each of the power transmission-distribution systems L1 through L3 but also allocated with respect to each maximum supply of electric power. So each of the priority levels is associated with the power transmission-distribution systems L1 through L3 and associated with each maximum supply of electric power.

Among the servers 101-1 through 101-$n$ coupled to the power transmission-distribution system L1, for the allocation result 1000-1, the maximum supply of electric power of the power transmission-distribution system L1 (6000 [kVA]) is divided into supply of electric power (3000 [kVA]) that may be supplied to a first server group having the priority level 1, supply of electric power (2000 [kVA]) that may be supplied to a second server group having the priority level 2, and supply of electric power 1000 [kVA] that may be supplied to a third server group having the priority level 3.

Note that it is possible to arbitrarily set a ratio of allocating the maximum supply of electric power of the power transmission-distribution system Lj to the priority level 1 through the priority level 3. In addition, the allocation table 1000 is stored in, for example, the RAM 300, the magnetic disk 305, the optical disk 307, or the like.

Figure 11:
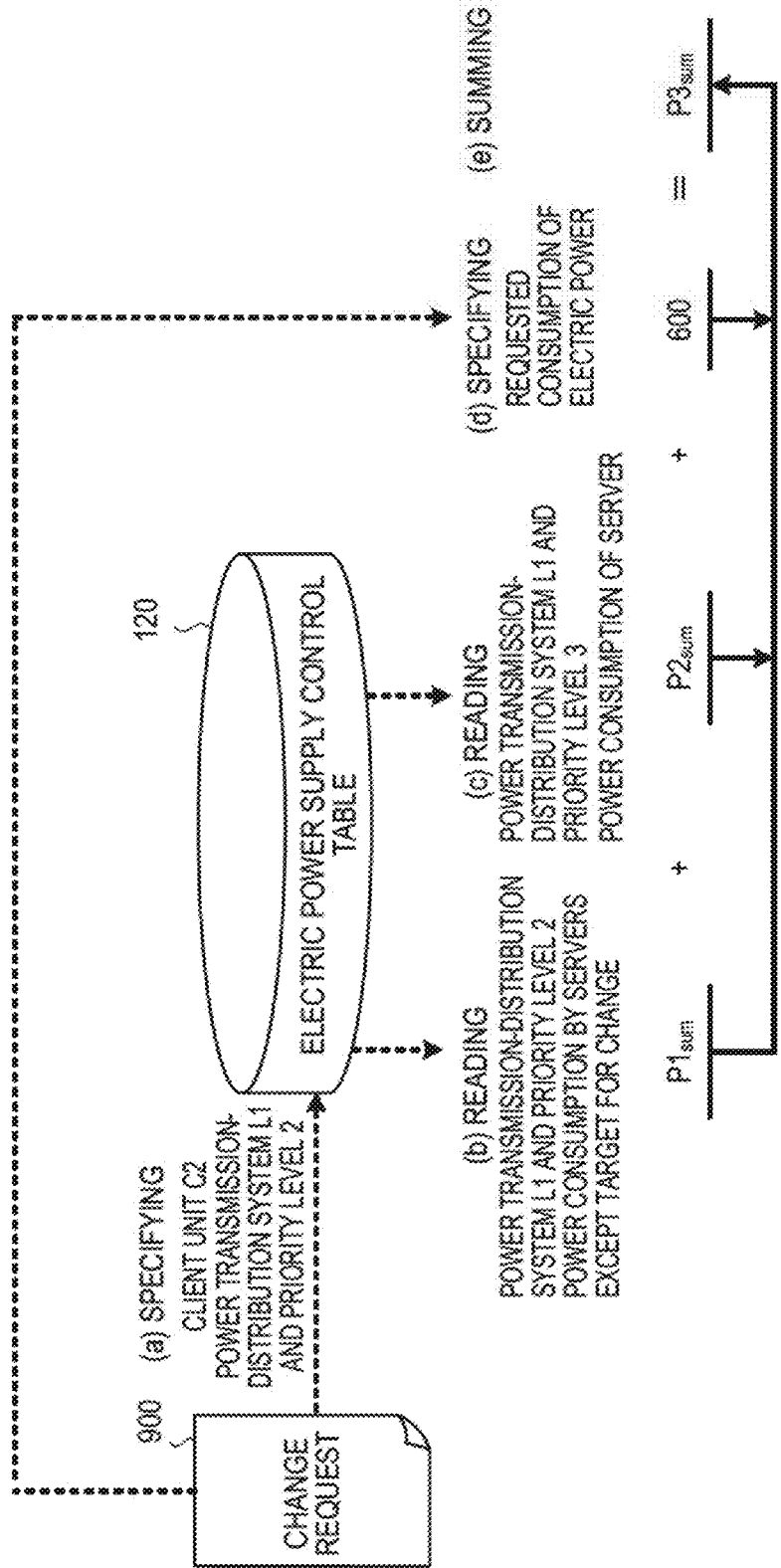
FIG. 11 is an explanatory diagram of an outline of a calculation process.

Hereinafter, it will be disclosed with reference to FIG. 11 that a calculation process of calculating the sum $P_{sum}$ of the consumption of electric power based on the priority level when the change request 900 illustrated in FIG. 9 is issued. FIG. 11 is an explanatory diagram of an outline of the calculation process. In FIG. 11, (a) first, the calculation unit 812 specifies the client unit C2, the power transmission-distribution system L1, and the priority level 2 based on the change request 900.

(b) Thereafter the calculation unit 812 reads the consumption of electric power of all the server groups except for the server 101-2 among the server groups, which are coupled to the power transmission-distribution system L1 and for which the priority level 2 is set, from the electric power supply control table 120 based on the client unit ID, the power transmission-distribution system ID, and the priority level. Then the calculation unit 812 calculates a first sum (hereinafter, referred to as a "$P1_{sum}$") by summing the consumption of electric power.

(c) Then the calculation unit 812 reads consumption of electric power of a server group, which is coupled to the power transmission-distribution system L1 and whose priority level is lower than the priority level 2 (here, priority level 3), from the electric power supply control table 120 based on the power transmission-distribution system ID and the priority level. Then the calculation unit 812 calculates a second sum (hereinafter, referred to as a "$P2_{sum}$") by summing the consumption of electric power.

(d) Thereafter the calculation unit 812 specifies the consumption of electric power (here, 600 [W]) of the server 101-2 based on the change request 900. (e) Finally, the calculation unit 812 calculates a third sum (hereinafter, referred to as a "$P3_{sum}$") by summing the sum $P1_{sum}$, the sum $P2_{sum}$, and the consumption of electric power of the server 101-2.

The sum $P3_{sum}$ is a total amount of supply of electric power in the power transmission-distribution system L1 desired for responding to the change request 900 from the client unit C2. The sum $P3_{sum}$ is the total amount of the supply of electric power necessary for supplying the electric power to the server groups whose priority levels are equal to or lower than that of the server 101-2 (that is, the server groups having the priority level 2 and the priority level 3).

Next the calculation unit 812 refers to the allocation table 1000 illustrated in FIG. 10 and calculates the maximum supply of electric power $P_{max}$, which is subject to a comparison with the sum $P3_{sum}$. First, the calculation unit 812 reads the allocation result 1000-1 associated with the power transmission-distribution system L1 to which the server 101-2 is coupled from the allocation table 1000.

Then the calculation unit 812 specifies the supply of electric power (here, 2000 [kVA] and 1000 [kVA]) allocated to the priority level 2 and the priority level 3 whose priority levels are equal to or lower than that of the server 101-2 and calculates the maximum supply of electric power $P_{max}$ subject to the comparison with the sum $P3_{sum}$ by summing the supply of electric power. Here the maximum supply of electric power $P_{max}$ is 3000 [kVA].

The determination unit 814 determines whether or not the change in the power supply-distribution capacity is allowable by substituting the sum $P3_{sum}$ of the consumption of electric power and the maximum supply of electric power $P_{max}$ into Equation (2) (note that the sum $P_{sum}$ in the above Equation (2) corresponds to the sum $P3_{sum}$.) based on the judgment process i) disclosed above. With the determination, the supply of electric power in the power transmission-distribution system L1 allocated to the priority level 2 and the priority level 3 may be supplied to the server 101-2 having the priority level 2.

The update unit 816 has a function of updating the power supply-distribution capacity and the cooling capacity of the server 101-*i* stored in the electric power supply control table 120 to a power supply-distribution capacity and a cooling capacity corresponding to the change request if the determination unit 814 determines that the change is allowable.

For example, the update unit 816 updates the power supply-distribution capacity and the cooling capacity of the server 101-2 stored in the electric power supply control table 120 to a power supply-distribution capacity and the cooling capability corresponding to the change request 900 if the determination unit 814 determines that the change indicated by the change request 900 is allowable. With the update disclosed above, the contents stored in the electric power supply control table 120 that vary from hour to hour in response to the change request from the client unit Ci may be kept up-to-date.

Note that the Equations (1) through (6) disclosed above are stored, in advance, for example, in the RAM 303, the magnetic disk 305, the optical disk 307, or the like. In addition, if the Equations (1) through (6) are used, the Equations are read therefrom.

The embodiment discloses a case, as one example, where one master unit M is provided with respect to the data center X. However, it may also be possible that the supply of electric power in the data center X is controlled in a distributed manner by a plurality of master units M in consideration of the load applied to the master unit M.

(Functional Configuration of Client Unit)

Hereinafter a functional configuration of the client unit Ci will be disclosed. In FIG. 8, the client unit Ci has a configuration that includes a server communication unit 821, a specifying unit 822, a sender unit 823, an electric power control unit 825, and a receiver unit 824. The function serving as a control unit (server communication unit 821 through receiver unit 824) is achieved by causing the CPU 301 to execute a program stored in, for example, the ROM 302, the RAM 303, the magnetic disk 305, the optical disk 307 and so on or the I/F 309 illustrated in FIG. 3.

The server communication unit 821 has a function of making communication with the server 101-*i* and the use of electric power by the server 101-*i* is subject to control. For example, the server communication unit 821 receives the state change request by the server 101-*i* by making communication with the electric power saving control function 203 of the server 101-*i* (see FIG. 2). Note that a result of reception is stored in, for example, the RAM 303, the magnetic disk 305, the optical disk 307, or the like.

The specifying unit 822 has a function of specifying the power supply-distribution capacity and/or the cooling capacity desired for the server 101-*i* by referring to a state table (for example, state table 400 illustrated in FIG. 4) of the server 101-*i* by using the state change request received by the server communication unit 821.

For example, the specifying unit 822 refers to the state table 400 and specifies request values (consumption of electric power, amount of heat generation, voltage frequency, UPS duration time, and instantaneous interruption time) of the state S3 as the power supply-distribution capacity and/or the cooling capacity which are desired for the server 101-2 if the specifying unit 822 receives the state change request for changing the state of the server 101-2 from the state S2 to the state S3. Note that a result that has been specified is stored in, for example, the RAM 303, the magnetic disk 305, the optical disk 307, or the like.

The sender unit 823 has a function of sending, to the master unit M, the change request for changing the power supply-distribution capacity supplied to the server 101-*i* into the power supply-distribution capacity specified by the specifying unit 822. Similarly, it may also be possible that the sender unit 823 sends the change request for changing the cooling capacity allocated to the server 101-*i* into the cooling capacity specified by the specifying unit 822.

For example, the sender unit 823 sends the specified power supply-distribution capacity and the specified cooling capacity, the client ID of the client unit Ci, the power transmission-distribution system ID of the transmission-distribution system to which the server 101-*i* is coupled, the change request (for example, the change request 900 illustrated in FIG. 9) that includes the area ID of the area in which the server 101-*i* is located, to the master unit M.

The receiver unit 824 has a function of receiving the change response indicating whether or not the change in the power supply-distribution capacity supplied to the server 101-*i* and/or the cooling capacity allocated to the server 101-*i* are allowable, from the master unit M, in response to reception of the change request sent by the sender unit 823. The change request is a result of the determination by the determination unit of the master unit M.

The power control unit 825 has a function of controlling the use of electric power of the server 101-*i* based on the change response received by the receiver unit 824. For example, it may also be possible that the power control unit 825 controls the server communication unit 821 and sends the change response that allows the change in the state, to the server 101-*i* if the power control unit 825 receives the change response indicating that the change in the power supply-distribution capacity supplied to the server 101-*i* is allowable.

In addition, it may also be possible that the power control unit 825 controls the server communication unit 821 and sends the change response indicating that the change in the state is not allowed, to the server 101-*i*, if the power control unit 825 receives the change response indicating that the change in the power supply-distribution capacity supplied to the server 101-*i* is not allowable. The server 101-*i* is configured to carry out the change in the state in response to the change response from the client unit Ci.

Moreover, the following process is configured to be executed if the change response includes the effective time limit indicating that the change in the power supply-distribution capacity supplied to the server 101-*i* is allowable. First, the power control unit 825 judges whether or not the state change request is made by the server 101-*i* during a period before the effective time limit is reached. Here, the sender unit 823 sends the extension request for extending the power supply-distribution capacity currently supplied to the server 101-*i* and the cooling capacity currently allocated to the server 101-*i* to the master unit M if the state change request is not made. Note that the timing of sending the extension request may be any time before the effective time limit is reached.

As a result thereof, the power control unit 825 causes the server 101-*i* to terminate the use of electric power if the receiver unit 824 receives the extension response indicating that the extension is not allowed. For example, it may also be possible that the power control unit 825 controls the server communication unit 821 and sends the instruction of change for changing into the state 0 indicating the power "OFF state", to the server 101-*i*. Note that the current time for judging the effective time limit is measured in the client unit Ci.

This embodiment discloses a case where one client unit Ci is provided with respect to the server 101-*i*. Note, however, that it may also be possible that the use of electric power of the plurality of servers is controlled by implementing the function of the client unit Ci on a distribution board or a power supply tap in the data center X. In the above case, for example, control may be performed over whether or not use of the maximum consumption of electric power (at the time of high load) in each of the servers is allowable.

With the techniques disclosed above, the method disclosed in this embodiment may be applicable to non-compatible electronic apparatuses that do not have the functions 201 through 203 illustrated in FIG. 2. Note that the maximum consumption of electric power in each of the servers is input to the distribution board or the power supply tap by the user who manipulates, for example, the keyboard 310 and the mouse 311 illustrated in FIG. 3.

(Procedures for Power Supply Control in Master Unit)

Figure 12:
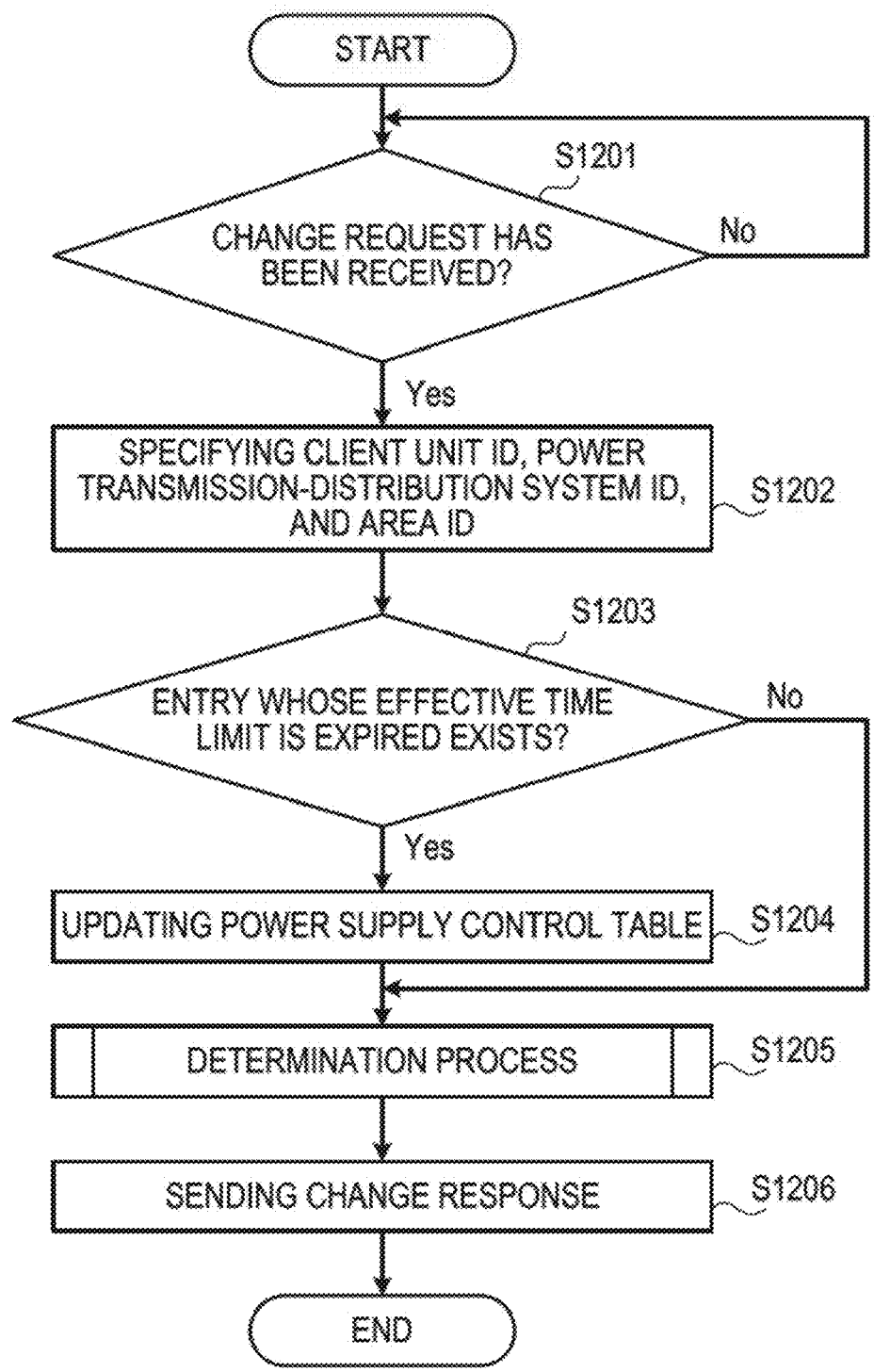
FIG. 12 is a flow chart (first procedures) of one example of procedures for power supply control in a master unit.

Hereinafter procedures for a power supply control in the master unit M will be disclosed. First of all, procedures executed based on each of the power transmission-distribution systems provided in the data center X will be disclosed. FIG. 12 illustrates a flow chart (first procedures) describing one example of the procedures for the power supply control in the master unit M.

First, the receiver unit 811 judges whether or not the change request associated with the server 101-*i* has been received (operation S1201) in the flow chart in FIG. 12 (operation S1201). Here, the master unit M waits for reception of the change request (operation S1201: No). If the change request is received (operation S1201: Yes), the master unit M specifies the client unit ID, the power transmission-distribution system ID, and the area ID each included in the change request (operation S1202).

Then the master unit M refers to the electric power supply control table 120 and judges whether or not there is an expired entry (operation S1203). Here, the update unit 816 deletes the expired entry and updates the contents stored in the electric power supply control table 120 (operation S1204) if there is an expired entry (operation S1203: Yes).

Next the determination unit 814 executes a determination process that determines whether or not the change in response to the change request from the client unit Ci is allowable (operation S1205). The sender unit 815 sends the change response based on a result of the determination to the client unit Ci (operation S1206), and the procedures according to the flow chart are completed. Note that the procedure goes to operation S1205 if there is no expired entry in the operation S1203 (operation S1203: No).

Figure 13:
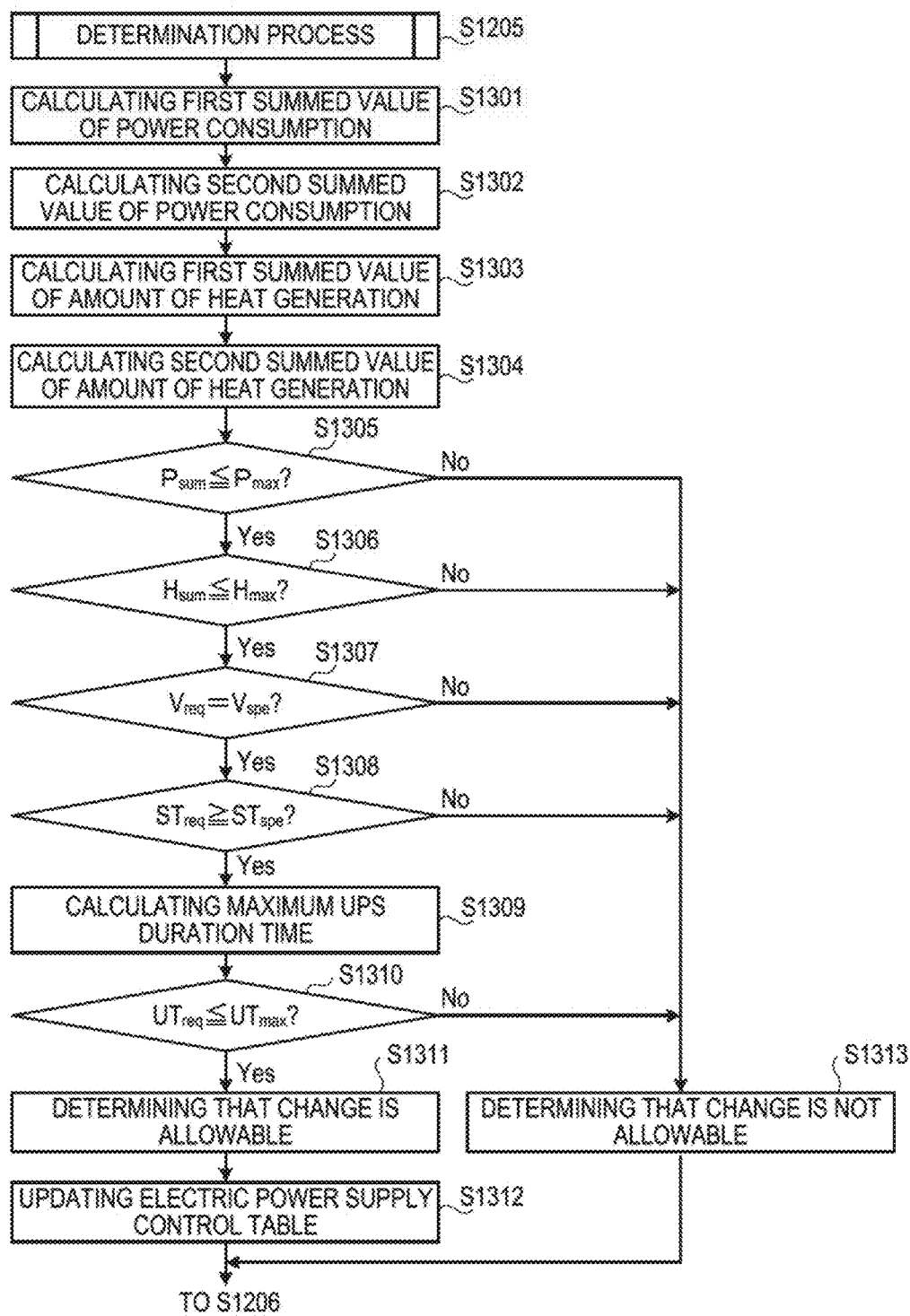
FIG. 13 is a flow chart of one example of detailed procedures for a determination process.

Next, detailed procedures for the determination process in the operation S1205 illustrated in FIG. 12 will be disclosed. FIG. 13 illustrates a flow chart describing one example of the detailed procedures for the determination process.

The calculation unit 812 reads the consumption of electric power of all the server groups except for the server 101-*i* among the server groups coupled to the transmission-distribution system Lj from the power supply control table 120, based on the client unit ID and the power transmission-distribution ID each specified in the operation S1202 illustrated in FIG. 12. Then the calculation unit 812 calculates the first sum of the consumption of electric power by summing the consumption of electric power (operation S1301).

Thereafter the calculation unit 812 calculates the second sum (hereinafter, referred to as the "sum $P_{sum}$") by summing the first sum and the consumption of electric power of the server 101-*i* specified based on the change request received in the operation S1201 illustrated in FIG. 12 (operation S1302).

Next the calculation unit 812 reads the amount of heat generation in all the server groups except for the server 101-*i* among the server groups located in the area Ak from the power consumption control table 120 based on the client unit ID and the area ID. Then the calculation unit 812 calculates the first sum of the amount of heat generation by summing these amounts of heat generation (operation S1303).

Thereafter the calculation unit 812 calculates the second sum (hereinafter, referred to as the "sum $H_{sum}$") by summing the first sum and the amount of heat generation in the server 101-*i* based on the change request received in operation S1201 (operation S1304).

Thereafter the comparison unit 813 judges whether or not the sum $P_{sum}$ falls within the range of the maximum supply of electric power $P_{max}$ by using the Equation (2) disclosed above (operation S1305). The procedure goes to operation S1306 if the sum $P_{sum}$ falls within the range of the maximum supply of electric power $P_{max}$ (operation S1305: Yes). On the other hand, the determination unit 814 determines that the change in response to the change request is not allowable (operation S1313 if the sum $P_{sum}$ does not fall within the range of the maximum supply of electric power $P_{max}$ (operation S1305: No).

In operation S1306, the comparison unit 813 judges whether or not the sum $H_{sum}$ falls within the range of the maximum cooling capacity $H_{max}$ by using Equation (3) disclosed above (operation S1306). The procedure goes to operation S1307 if the sum $H_{sum}$ falls within the range of the maximum cooling capacity $H_{max}$ (operation S1306: Yes). On the other hand, the determination unit 814 determines that the change in response to the change request is not allowable (operation S1313) if the sum $H_{sum}$ does not fall within the range of the maximum cooling capacity $H_{max}$ (operation S1306: No).

In operation S1307, the comparison unit 813 judges whether or not the specification voltage $V_{spe}$ of the power transmission-distribution system Lj based on the maximum power supply-distribution capacity table 500 matches the request voltage $V_{req}$ based on the change request (operation S1307), by using Equation (4) disclosed above. The procedure goes to operation S1308 if both voltages $V_{spe}$ and $V_{req}$ match each other (operation S1307: Yes). The determination unit 814 determines that the change in response to the change request is not allowable (operation S1313) if the voltages $V_{spe}$ and $V_{req}$ do not match each other (operation S1307: No).

The comparison unit 813 judges whether or not the specification instantaneous interruption time $ST_{spe}$ of the power transmission-distribution system Lj based on the maximum power supply-distribution capacity table 500 satisfies the requested instantaneous interruption time $ST_{req}$ based on the change request by using Equation (6) disclosed above (operation S1308). The procedure goes to operation S1309 if the requested instantaneous interruption time $ST_{req}$ specified based on the change request is satisfied (operation S1308: Yes). The determination unit 814 determines that the change in response to the change request is not allowable (operation S1313) if the requested instantaneous interruption time $ST_{req}$ based on the change request is not satisfied (operation S1308: No).

In operation S1309, the calculation unit 812 calculates the maximum UPS duration time $UT_{max}$ by substituting the UPS capacitance $C_{max}$ of the power transmission-distribution system Lj based on the maximum power supply-distribution capacity table 500 and the sum $P_{sum}$ of the consumption of electric power of the power transmission-distribution system Lj calculated in operation S1302 into Equation (1) (operation S1309).

Then, the comparison unit 813 judges whether or not the request UPS duration time $UT_{req}$ based on the change request falls within the range of the maximum UPS duration time $UT_{max}$ by using Equation (5) disclosed above (operation S1310). The determination unit 814 determines that the change in response to the change request is allowable (operation S1311) if the request UPS duration time $UT_{req}$ falls within the range of the maximum UPS duration time $UT_{max}$ (operation S1310: Yes). Then the update unit 816 updates the contents stored in the electric power supply control table 120, in response to the change request (operation S1312), and the procedure goes to operation S1206 illustrated in FIG. 12.

On the other hand, in operation S1310, the determination unit 814 determines that the change in response to the change request is not allowable (operation S1313), the procedure goes to the operation S1206 illustrated in FIG. 12 if the request UPS duration time $UT_{req}$ does not fall within the range of the maximum UPS duration time $UT_{max}$ (operation S1310: No).

With the procedures disclosed above, the power supply-distribution capacity of the entire data center X for changing the power supply-distribution capacity supplied to the server 101-i may be accurately estimated. In addition, the supply of electric power that exceeds the maximum power supply-distribution capacity of the data center X may be suppressed, based on a result of the estimation, by determining whether or not the change in the power supply-distribution capacity supplied to the server 101-i is allowable.

In addition, the cooling capacity of the entire data center X for changing the cooling capacity allocated to the server 101-i may be accurately estimated. The amount of heat generation that exceeds the maximum cooling capacity of the data center X may be suppressed, based on a result of the estimation, by determining whether or not the change in the cooling capacity allocated to the server 101-i is allowable.

Figure 14:
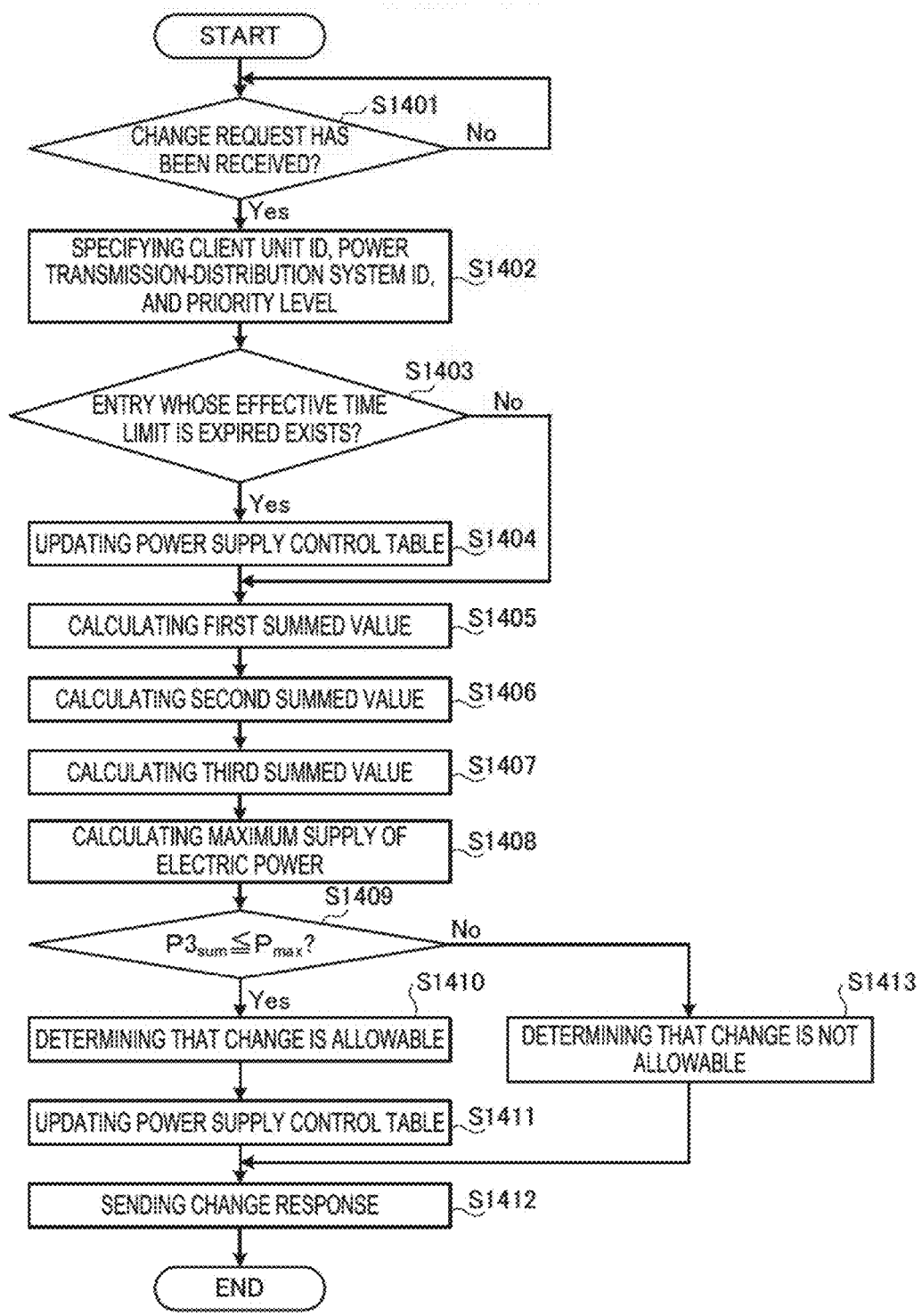
FIG. 14 is a flow chart (second procedures) of one example of procedures for the power supply control in the master unit.

Next, procedures for the power supply control, which are executed based on the priority levels set for each of the servers 101-1 through 101-n, will be disclosed. Note that, here, the procedures for the power supply control executed based on each of the priority levels will be disclosed by focusing on the supply of electric power (power supply-distribution capacity) capable of being supplied to each of the servers 101-1 through 101-n. FIG. 14 illustrates a flow chart (second procedures) describing one example of the procedures for the power supply control of the master unit.

The receiver unit 811 judges whether or not the change request associated with the server 101-i has been received (operation S1401). Here, the master unit M waits for reception of the change request (operation S1401: No). The master unit M specifies the client unit ID, the power transmission-distribution system ID, and the priority level included in the change request (operation S1402) if the change request has been received (operation S1401: Yes).

Thereafter the master unit M refers to the power supply control table 120 and judges whether or not there is an expired entry (operation S1403). Here, the update unit 816 deletes the expired entry and updates the contents stored in the power supply control table 120 (operation S1404) if there is an expired entry (operation S1403: Yes). On the other hand, the procedure goes to operation S1405 if there is no expired entry (operation S1403: No).

Then the calculation unit 812 reads the consumption of electric power of all the server groups except for the server 101-i among the server groups, which is coupled to the power transmission-distribution system Lj and for which the priority levels equal to that of the server 101-i is set, from the power supply control table 120 based on the client unit ID, the power transmission system ID, and the priority level specified in operation S1402. Then the calculation unit 812 calculates the first sum "hereinafter referred to as the "sum $P1_{sum}$") by summing the consumption of electric power (operation S1405).

Moreover the calculation unit 812 reads the consumption of electric power of the server groups, which are coupled to the power transmission-distribution system Lj and for which the priority levels lower than that of the server 101-i, from the power supply control table 120 based on the power transmission system ID and the priority level. Then the calculation unit 812 calculates the second sum "hereinafter referred to as the "sum $P2_{sum}$") by summing the consumption of electric power (operation S1405).

Then, the calculation unit 812 calculates the third sum (hereinafter, referred to as the "sum $P3_{sum}$") by summing the consumption of electric power of the server 101-i based on the change request received in operation S1401, the sum $P1_{sum}$, and the sum $P2_{sum}$ (operation S1407).

Then the calculation unit 812 refers to the allocation table 1000 and calculates the maximum supply of electric power $P_{max}$ subject to the comparison with the sum $P3_{sum}$ by summing the supply of electric power allocated to the priority levels equal to or lower than the priority level of the server 101-i in the maximum supply of electric power of the power transmission-distribution system Lj to which the server 101-i is coupled (operation S1408).

Then the comparison unit 813 judges whether or not the sum $P3_{sum}$ falls within the range of the maximum supply of electric power $P_{max}$ calculated in operation S1408 by using Equation (2) disclosed above (operation S1409). The determination unit 814 determines that the change in response to the change request is allowable (operation S1410) if the sum $P3_{sum}$ falls within the range of the maximum supply of electric power $P_{max}$ (operation S1409: Yes).

Then, the update unit 816 updates the contents stored in the power supply control table 120 in response to the change request (operation S1411). Finally the sender unit 815 sends the change response based on a result of the determination by the determination unit 814 to the client unit Ci (operation S1412), and the procedures according to the flow chart are completed.

Moreover, in operation S1409, the determination unit 814 determines that the change in response to the change request is not allowable (operation S1413) if the sum $P3_{sum}$ does not fall within the range of the maximum supply of electric power $P_{max}$ (operation S1409: No). The sender unit 815 sends the change response in response to a result of the determination (operation S1412) to the client unit Ci, and the procedures according to the flow chart are completed.

With the procedures disclosed above, the power supply-distribution capacity capable of being supplied in the data center X may be preferentially supplied to the servers 101-1 through 101-n having the high priority levels.

(Procedures for Power Supply Control in Client Unit)

Next, procedures for a power supply control in the client unit Ci will be disclosed.

Figure 15:
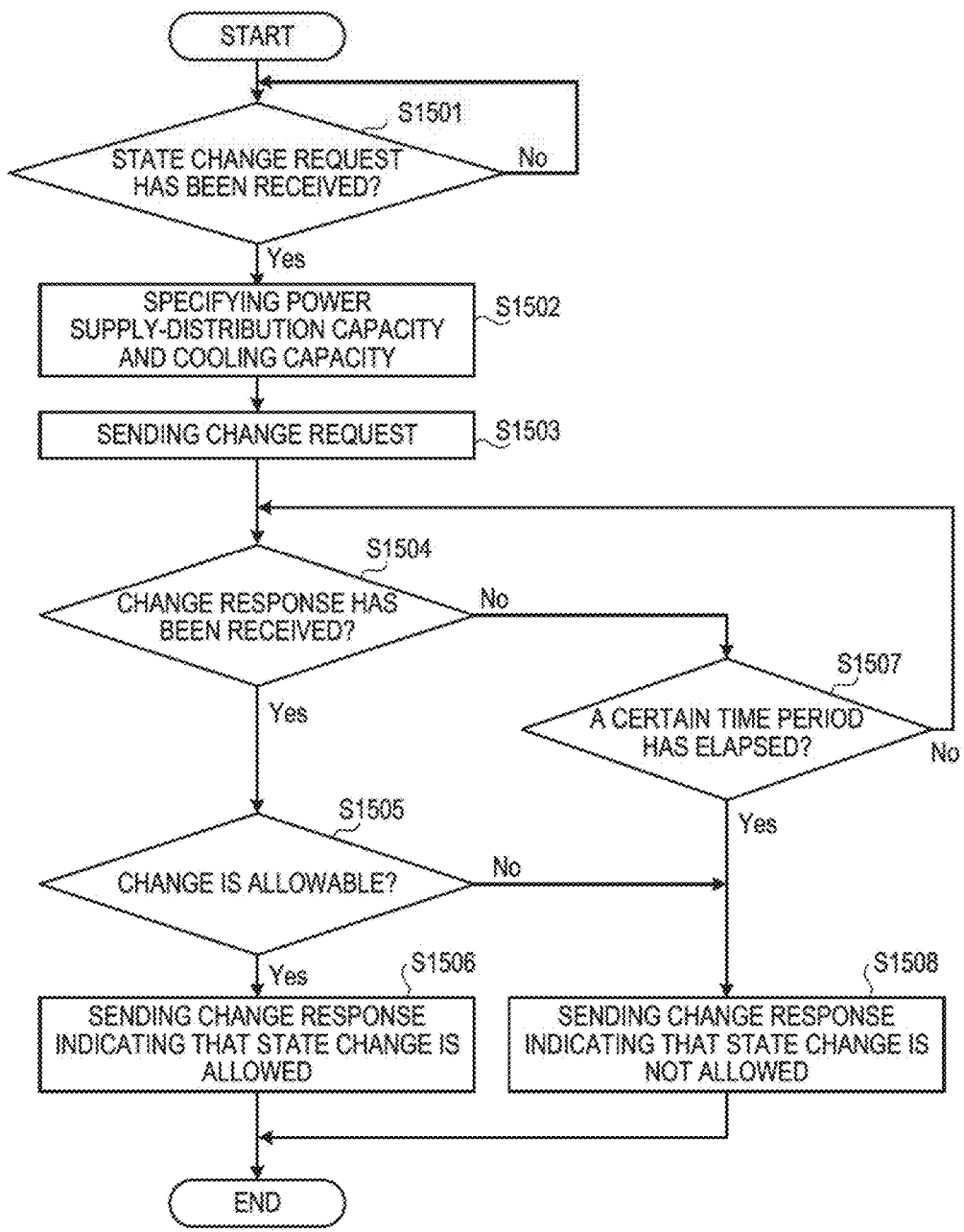
FIG. 15 is a flow chart of one example of procedures for power supply control in a client unit.

FIG. 15 is a flow chart describing one example of the procedures for the power supply control in the client unit. First, the server communication unit 821 judges whether or not the state change request by the server 101-$i$ has been received in the flow chart in FIG. 15 (operation S1501).

Here, the client unit Ci waits for reception of the state change request (operation S1501: No). The client unit Ci specifies the power supply-distribution capacity and the cooling capacity for the server 101-$i$ based on the state change request (operation S1502) if the state change request has been received (operation S1501: Yes). Then the sender unit 823 sends the change request for changing the power supply-distribution capacity and the cooling capacity of the server 101-$i$ into the specified power supply-distribution capacity and the specified cooling capacity, to the master unit M (operation S1503).

Then, the receiver unit 824 judges whether or not the change response has been received (operation S1504). The above change response indicates whether or not the changes in the power supply-distribution capacity and the cooling capacity of the server 101-$i$ are allowable. Here the client unit Ci judges whether or not the change is allowable based on the change response (operation S1505) if the change response has been received (operation S1504: Yes).

Here the server communication unit 821 sends the change response allowing the change in the state to the server 101-$i$ (operation S1506). If the change is allowable (operation S1505: Yes), and then the procedures of the flow chart are completed. On the other hand, the server transmission unit 821 sends the change response indicating that the change in the state is not allowable to the server 101-$i$ (operation S1508) if the change is not allowed (operation S1505: No), and then the procedures of the flow chart are completed.

In the operation S1504, furthermore, the client unit Ci judges (operation S1507) whether or not a certain time period has elapsed after the change request has been sent in the operation S1503 if the change response has not been received (operation S1504: No). The procedure returns to the operation S1504 if the certain time period has not elapsed (operation S1507: No).

On the other hand, the server communication unit 821 sends the change response indicating that the change in the state is not allowed to the server 101-$i$ (operation S1508) if the certain time period has elapsed (operation S1507: Yes), and then the procedures of the flow chart are completed. Note that the certain time period judged in the operation S1507 is set arbitrarily in advance and stored in, for example, the RAM 303 in the client unit Ci, the magnetic disk 305, the optical disk 307, or the like.

With the procedures disclosed above, the use of electric power by the servers 101-$i$ may be controlled based on the change response from the master unit M.

(Procedures for Extension Request)

Figure 16:
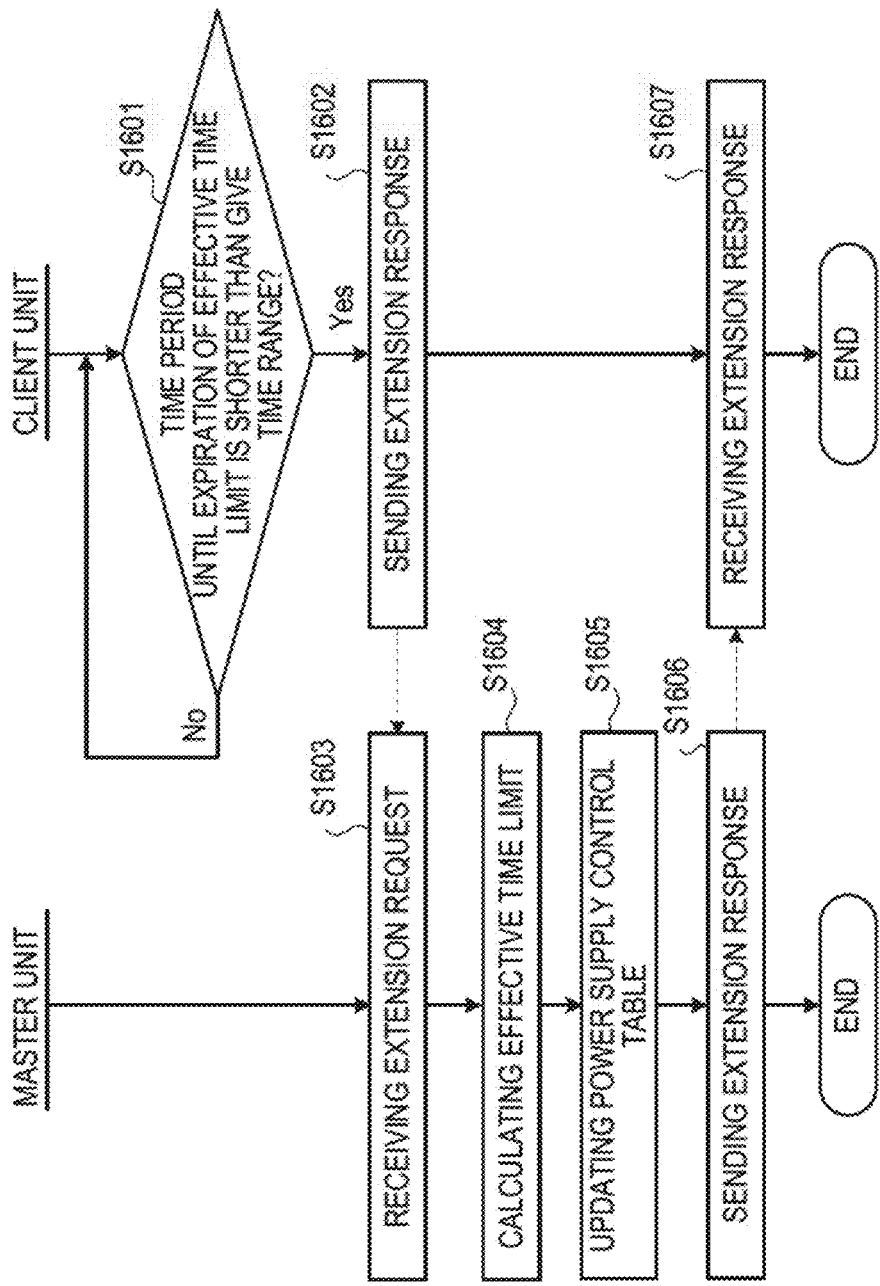
FIG. 16 is a sequence diagram of procedures for an extension request.

Next, procedures for the extension request for extending the power supply-distribution capacity and the cooling capacity used in the server 101-$i$ will be disclosed. FIG. 16 illustrates a sequence diagram indicating the procedure for extension request.

The client unit Ci judges whether or not a time period until the effective time limit during which the server 101-$i$ may use the power supply-distribution capacity and the cooling capacity is shorter than a given time range (operation S1601). Here, the client unit Ci waits until the given time has been reached (operation S1601: No). The sender unit 823 of the client unit Ci sends the extension request associated with the power supply-distribution capacity and the cooling capacity of the server 101-$i$ to the master unit M (operation S1602) if the time period is shorter than the given time range (operation S1601: Yes).

Then, the receiver unit 811 of the master unit M receives the extension request associated with the power supply-distribution capacity and the cooling capacity of the server 101-$i$ from the client unit Ci (operation S1603). Then the calculation unit 812 of the master unit M calculates a new effective time limit associated with the power supply-distribution capacity and the cooling capacity of the server 101-$i$ (operation S1604). The update unit 816 of the master unit M updates the contents stored in the power supply control table 120 by using the calculated effective time limit (operation S1605).

Next, the sender unit 815 of the master unit M sends an extension response that includes the effective time limit calculated in the operation S1604 to the client unit Ci (operation S1606). Finally, the receiver unit 824 of the client unit Ci receives the extension response associated with the power supply-distribution capacity and the cooling capacity of the server 101-$i$ from the master unit M (operation S1607).

Note that the given time judged in the operation S1601 is arbitrarily set in advance and stored in, for example, the RAM 303 in the client unit Ci, the magnetic disk 305, the optical disk 307, or the like.

With the procedures disclosed above, a system to allow the withdrawal of the power supply-distribution capacity supplied to each of the servers 101-1 through 101-$n$ and the cooling capacity allocated to each of the servers 101-1 through 101-$n$ may be achieved.

As disclosed above, according to the embodiment, the supply of electric power that exceeds the maximum supply of electric power in the data center X may be effectively suppressed by accurately estimating the power supply-distribution capacity necessary for the data center X. As a result, this embodiment may allow the installation and the operation of the electronic apparatuses while optimizing the power supply-distribution capacity in the data center X. Thus, the excessive investment in the power supply-distribution equipment in the data center X may be reduced if not prevented.

Moreover situations where the consumption of electric power exceeds the maximum supply of electric power in the data center X may be avoided in advance of the actual use of electric power by each of the servers 101-1 through 101-$n$. Consequently, as opposed to the conventional breakers and fuses, the supply of electric power in the data center X may be controlled without significant adverse effects (for example, data loss) on each of the servers 101-1 through 101-$n$.

Moreover the amounts of heat generation (consumption of electric power resulting from the electronic apparatuses) that exceeds the maximum cooling capacity in the data center X may be effectively suppressed by accurately estimating the cooling capacity necessary for the data center X. In addition, uneven heat distribution may be suppressed by controlling heat generation based on each of the separated-areas in the data center X.

Whether or not the change in the power supply-distribution capacity supplied to the electronic apparatuses in the facility is allowable may be determined based on the result of the comparison between the maximum power supply-distribution capacity that may be supplied in the facility and the total of the power supply-distribution capacities for responding to the change.

This embodiment may achieve advantageous effects of effectively suppressing the supply of electric power that exceeds the power supply-distribution capacity of the facility and effectively reducing, if not preventing, the excessive investment in the power supply-distribution equipment by accurately estimating the power supply-distribution capacity necessary for the facility, such as, the data center, the server room, or the like.

It should be noted that a method of controlling the supply of electric power disclosed in the embodiment may be achieved with a program that is prepared in advance and executed by a computer, for example, a personal computer, a work-station or the like. The program is executed by being stored in computer readable storage media, for example, a hard disk, a flexible disk, a CD-ROM, an MO, a DVD or the like, and being read from the storage media by the computer.

What is claimed is:

1. A power supply control apparatus capable of communicating with a power control apparatus which controls use of electric power of an electronic apparatus to which a power supply-distribution capacity is supplied in a facility, the power supply control apparatus comprising:
a storing unit which stores the power supply-distribution capacity supplied to the plurality of electronic apparatuses located in the facility from among maximum power supply-distribution capacities capable of being supplied to the facility;
a receiver unit which receives a change request to change a power supply-distribution capacity supplied to one electronic apparatus among the plurality of electronic apparatuses from the power control apparatus controlling use of electric power of the one electronic apparatus;
a calculation unit which calculates a sum of the power supply-distribution capacity supplied to the one electronic apparatus in response to the received change request, and the power supply-distribution capacities supplied to the other electronic apparatuses except the one electronic apparatus from contents stored in the storing unit;
a comparison unit which compares the maximum power supply-distribution capacity to the sum of the calculated power supply-distribution capacities;
a determination unit which determines whether or not a change in the power supply-distribution capacity supplied to the one electronic apparatus is allowable based on a result of the comparison; and
a sender unit which sends a result of the determination to the power control apparatus.

2. The power supply control apparatus according to claim 1, wherein the determination unit determines, as the result of the comparison, that the change in the power supply-distribution capacity supplied to the one electronic apparatus is allowable if the sum of the power supply-distribution capacities is equal to or less than the maximum power supply-distribution capacity.

3. The power supply control apparatus according to claim 1, further comprising:
a power supply-distribution capacity update unit which updates the power supply-distribution capacity of the one electronic apparatus stored in the storing unit to a power supply-distribution capacity corresponding to the change request if the change is determined to be allowable.

4. The power supply control apparatus according to claim 1, wherein the comparison unit compares the maximum power supply-distribution capacity to the power supply-distribution capacity supplied to the one electronic apparatus in response to the change request.

5. The power supply control apparatus according to claim 1, wherein
the storing unit stores a power supply-distribution capacity supplied to an electronic apparatus coupled to a power transmission-distribution system from among maximum power supply-distribution capacities of the power transmission-distribution system with respect to each of the power transmission-distribution systems provided in the facility;
the receiver unit receives a change request of a power supply-distribution capacity supplied to one electronic apparatus coupled to one power transmission-distribution system among the plurality of power transmission-distribution systems from the power control apparatus controlling use of electric power of the one electronic apparatus;
the calculation unit calculates, in response to the received change request, a sum of the power supply-distribution capacity supplied to the one electronic apparatus and power supply-distribution capacities supplied to the other electronic apparatuses except the one electronic apparatus among electronic apparatuses coupled to the one power transmission-distribution system; and
the comparison unit compares a maximum power supply-distribution capacity of the one power transmission-distribution system to the sum of the calculated power supply-distribution capacities.

6. The power supply control apparatus according to claim 1, wherein
the storing unit stores a power supply-distribution capacity supplied to an electronic apparatus among power supply-distribution capacities capable of being supplied to electronic apparatuses for which priority levels are set, with respect to each of the priority levels set for the electronic apparatuses;
the receiver unit receives a change request to change a power supply-distribution capacity supplied to one electronic apparatus for which a first priority level among the plurality of priority levels is set, from the power control apparatus controlling use of electric power of the one electronic apparatus;
the calculation unit calculates a sum of the power supply-distribution capacity supplied to the one electronic apparatus in response to the received change request and power supply-distribution capacities supplied to the other electronic apparatuses except the one electronic apparatus among electronic apparatuses for which priority levels are equal to or lower than the first priority level; and
the comparison unit compares a sum of electric power capable of being supplied to the electronic apparatuses having the priority levels equal to or lower than the first priority level to the sum of the calculated power supply-distribution capacities.

7. The power supply control apparatus according to claim 1, wherein
the storing unit stores cooling capacities allocated to a plurality of electronic apparatuses, which are targets to which the cooling capacities are allocated, from among maximum cooling capacities capable of being allocated in the facility;
the receiver unit receives a change request to change a cooling capacity allocated to one electronic apparatus from the power control apparatus;
the calculation unit calculates a sum of the cooling capacity allocated to the one electronic apparatus in response to the received change request and cooling capacities allocated to the other electronic apparatuses except the one electronic apparatus stored in the storing unit; and the comparison unit compares the maximum cooling capacity to the sum of the calculated cooling capacities.

8. The power supply control apparatus according to claim 7, wherein the determination unit determines, as a result of the comparison, that a change in the cooling capacity allocated to the one electronic apparatus is allowable if the sum of the cooling capacities is equal to or lower than the maximum cooling capacity.

9. The power supply control apparatus according to claim 7, further comprising:
a cooling capacity update unit which updates the cooling capacity of the one electronic apparatus stored in the storing unit to a cooling capacity corresponding to the change request if a change is determined to be allowable.

10. The power supply control apparatus according to claim 7, wherein
the storing unit stores a cooling capacity allocated to the electronic apparatus located in an area from among the maximum cooling capacities capable of being allocated in the area with respect to each of the areas which divide the facility;
the receiver unit receives a change request of a cooling capacity allocated to the one electronic apparatus located in one area among the plurality of areas from the power control apparatus controlling use of electric power of the one electronic apparatus;
the calculation unit calculates a sum of the cooling capacity allocated to the one electronic apparatus in response to the received change request and the cooling capacities allocated to the other electronic apparatuses except the one electronic apparatus among the electronic apparatuses located in the one area; and
the comparison unit compares a maximum cooling capacity in the one area to the sum of the calculated cooling capacities.

11. A power control apparatus which controls use of electric power of an electronic apparatus in a facility, the power control apparatus comprising:
a storing unit which stores a power supply-distribution capacity for the electronic apparatus with respect to each state indicating status of use of electric power in the electronic apparatus;
a communication unit which receives a state change request from the electronic apparatus;
a specifying unit which specifies, based on the received state change request, the power supply-distribution capacity for the electronic apparatus by referring to contents stored in the storing unit;
a sender unit which sends, to the power control apparatus, a change request to change the power supply-distribution capacity supplied to the electronic apparatus into a specified power supply-distribution capacity;
a receiver unit which receives, as a result of the change request which has been sent, a change response indicating whether or not a change in the power supply-distribution capacity supplied to the electronic apparatus is allowable, from the power control apparatus; and
a power control unit which controls the use of electric power of the electronic apparatus based on the received change response.

12. A power supply control method comprising:
receiving a change request of a power supply-distribution capacity supplied to one electronic apparatus among a plurality of electronic apparatuses from a power control apparatus controlling use of electric power in the one electronic apparatus;
calculating a sum of a power supply-distribution capacity supplied to the one electronic apparatus in response to the received change request and power supply-distribution capacities supplied to the other electronic apparatuses except the one electronic apparatus;
comparing a maximum power supply-distribution capacity to the sum of the calculated power supply-distribution capacities;
determining, based on a result of the comparison, whether or not a change in the power supply-distribution capacity supplied to the one electronic apparatus is allowable; and
sending a result of the determination to the power control apparatus.

* * * * *